(12) United States Patent
Hansen et al.

(10) Patent No.: US 12,023,600 B2
(45) Date of Patent: Jul. 2, 2024

(54) SYSTEMS AND METHODS FOR PROCESSING ESSENTIAL OILS

(71) Applicant: MACH TRANSONIC LLC, Seattle, WA (US)

(72) Inventors: Viggo K. Hansen, Seattle, WA (US); Fredrick Baden Holt, Seattle, WA (US); Sean Michael Maloy, Everett, WA (US); William James Whitlock, Jr., Mount Vernon, WA (US)

(73) Assignee: MACH TRANSONIC LLC, Seattle, WA (US)

( * ) Notice: Subject to any disclaimer, the term of this patent is extended or adjusted under 35 U.S.C. 154(b) by 0 days.

(21) Appl. No.: 17/736,860

(22) Filed: May 4, 2022

(65) Prior Publication Data
US 2022/0372396 A1 Nov. 24, 2022

Related U.S. Application Data

(63) Continuation of application No. 16/645,207, filed as application No. PCT/US2018/049800 on Sep. 6, 2018, now Pat. No. 11,345,874.

(60) Provisional application No. 62/692,924, filed on Jul. 2, 2018, provisional application No. 62/554,576, filed on Sep. 6, 2017.

(51) Int. Cl.
| | | |
|---|---|---|
| B01D 11/04 | (2006.01) | |
| B01D 1/06 | (2006.01) | |
| B01D 1/22 | (2006.01) | |
| B01D 3/10 | (2006.01) | |
| B01D 5/00 | (2006.01) | |
| B01D 11/02 | (2006.01) | |
| C11B 9/02 | (2006.01) | |
| F28D 15/04 | (2006.01) | |

(52) U.S. Cl.
CPC ............. B01D 1/06 (2013.01); B01D 1/22 (2013.01); B01D 3/10 (2013.01); B01D 5/006 (2013.01); B01D 11/0296 (2013.01); B01D 11/04 (2013.01); C11B 9/025 (2013.01); F28D 15/043 (2013.01)

(58) Field of Classification Search
CPC ...................................................... B01D 11/04
See application file for complete search history.

(56) References Cited

U.S. PATENT DOCUMENTS

| | | |
|---|---|---|
| 4,692,238 A | 9/1987 | Bodle et al. |
| 5,286,380 A | 2/1994 | Mellen |
| 5,358,625 A | 10/1994 | Gould |

(Continued)

FOREIGN PATENT DOCUMENTS

| | | |
|---|---|---|
| WO | 2010/088127 A2 | 8/2010 |
| WO | 2015/049585 A2 | 4/2015 |
| WO | 2017/024072 A1 | 2/2017 |

*Primary Examiner* — Donald R Spamer
(74) *Attorney, Agent, or Firm* — Seed IP Law Group LLP

(57) ABSTRACT

A system for processing essential oils includes a mixing tank, three winterization vessels, three respective filtering vessels, a fine filtering vessel, a holding tank, an evaporator, an essential oil reservoir, a solvent reservoir, and a solvent filtering vessel. The evaporator can include a heat exchanger configured to heat a plate down which a mixture including the oils flows, to evaporate other components of the mixture. Fluids can be advanced through the system using a pressurized inert gas.

6 Claims, 37 Drawing Sheets

(56) References Cited

U.S. PATENT DOCUMENTS

| | | | |
|---|---|---|---|
| 5,458,739 A * | 10/1995 | Boucher | B01D 3/4205 203/88 |
| 5,482,633 A | 1/1996 | Muraldihara et al. | |
| 5,516,923 A | 5/1996 | Herbert et al. | |
| 9,327,210 B1 | 5/2016 | Jones | |
| 2004/0147769 A1 | 7/2004 | Davis | |
| 2008/0075777 A1 | 3/2008 | Kennedy | |
| 2015/0122272 A1 | 5/2015 | Wasserman et al. | |
| 2016/0228787 A1 * | 8/2016 | Payack | B01D 11/028 |
| 2016/0303490 A1 | 10/2016 | Ellis | |
| 2017/0240841 A1 * | 8/2017 | Ellis | B01D 11/0292 |

* cited by examiner

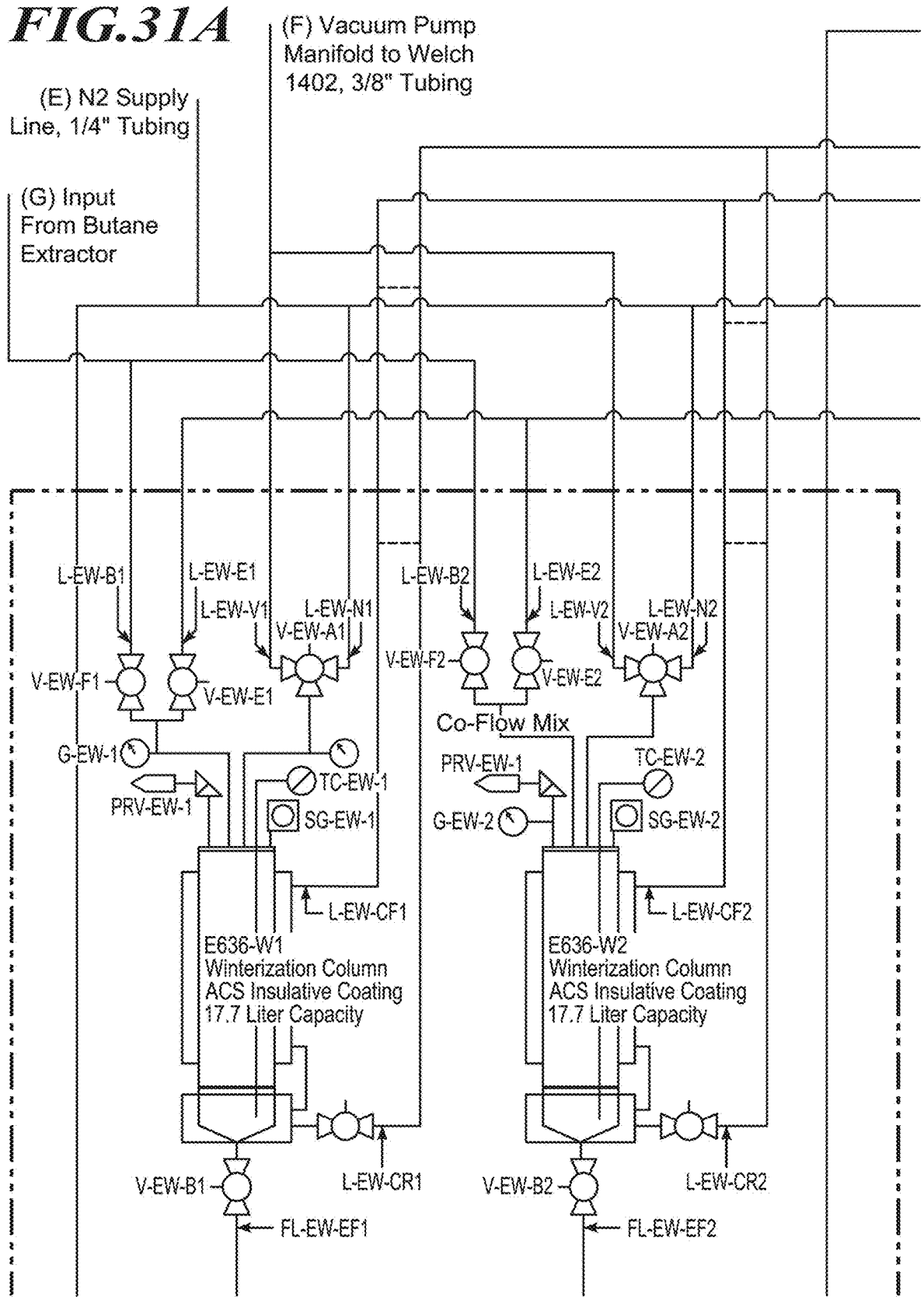

Part Labels

[Type]-[Extractor]-[Subsystem]-[Location/Purpose][Array #]
[Line]-[Extractor]-[Subsystem]-[Extractor]-[Subsystem]

Types: V (Valve), PRV (Pressure Relief Valve), G (Gauge), SG (Sightglass)
Extractor: E (Ethanol), B (Butane)
Subsystems: W (Winterization), F (Filtration), S (Storage), E (Shortpath Extractor), R (Reboiler), C (Cold-trap)
Locations: A (Top), B (Bottom), C (Coolant), CF (Coolant Feed), CR (Coolant Return), HF (Heating Feed), HR (Heating Return), N (Nitrogen), V (Vacuum)

Legend

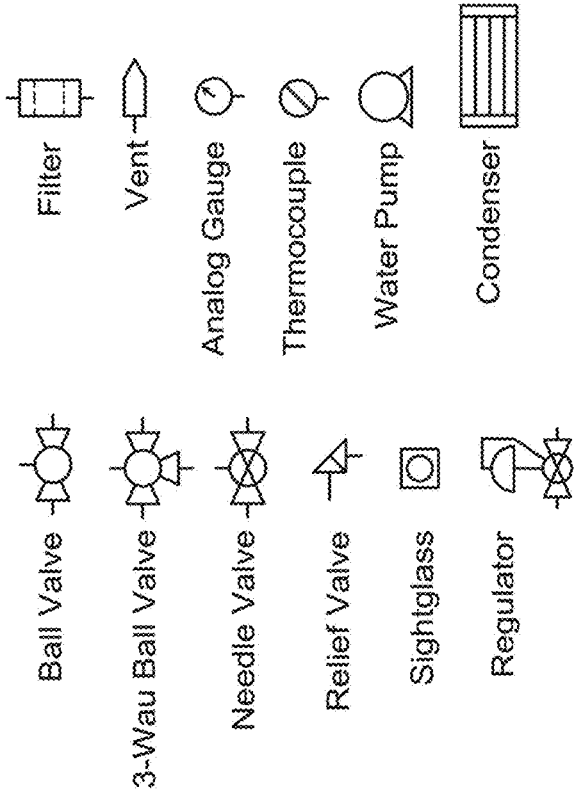

Ball Valve
3-Way Ball Valve
Needle Valve
Relief Valve
Sightglass
Regulator
Filter
Vent
Analog Gauge
Thermocouple
Water Pump
Condenser

Line Designations

Process ———
Electrical Signal -------
Pneumatic – – –

Process System Identifications

Stream, Species
A/B - HC50 Cooling Loop
C/D - HC10 Heating Loop
E - N2 Supply
F - Vacuum Line
G - Product Input From Butane Extractor

*FIG. 31I*

| PRV Settings | | |
|---|---|---|
| ID | PSIG | Model |
| EW-1 | 145 | OSS or Swagelok 4R3a |
| EW-2 | 145 | OSS or Swagelok 4R3a |
| EF-1 | 145 | OSS or Swagelok 4R3a |
| EF-2 | 145 | OSS or Swagelok 4R3a |
| ES-1 | 145 | OSS or Swagelok 4R3a |
| ES-2 | 145 | OSS or Swagelok 4R3a |
| ES-B | 145 | OSS or Swagelok 4R3a |
| EE | 30 | OSS or Swagelok 4R3a |
| ER | 30 | OSS or Swagelok 4R3a |
| EC | 30 | OSS or Swagelok 4R3a |
| ET | 30 | OSS or Swagelok 4R3a |

| Gaskets | Size | Min Temp (C) | Max Temp (C) |
|---|---|---|---|
| A40MPGR-200-V | 2" Sanitary Clamp | -73 | 260 |
| A40MPGR-400-V | 4" Sanitary Clamp | -73 | 260 |
| A40MPGR-600-V | 6" Sanitary Clamp | -73 | 260 |
| A40MPGR-1200-V | 6" Sanitary Clamp | -73 | 260 |

| Thermocouples | Manufacturer | Model | Thermocouple | Min Temp (C) | Max Temp (C) |
|---|---|---|---|---|---|
| TC-EE-1 | Conax | TW.0.5-260S-U30.00-S304 | K-Type | -260 | 1260 |
| TC-EE-2 | Conax | TW.0.5-260S-U30.00-S304 | K-Type | -260 | 1260 |
| TC-ER | Conax | TW.0.5-260W(SFA20/S316)-U19.00-S304 | K-Type | -260 | 1260 |
| TC-ES-1 | Conax | TW.0.5-260W(SFA20/S316)-U19.00-S304 | K-Type | -260 | 1260 |
| TC-ES-2 | Conax | TW.0.5-260W(SFA20/S316)-U19.00-S304 | K-Type | -260 | 1260 |
| TC-EW-1 | Conax | TW.0.5-260S-U42.00-S304 | K-Type | -260 | 1260 |
| TC-EW-2 | Conax | TW.0.5-260S-U42.00-S304 | K-Type | -260 | 1260 |

| Valve | Model | Min Temp (C) | Max Temp (C) | Pressure (PSI) | Seal |
|---|---|---|---|---|---|
| V-EBFCV-1 | 3088T2 | | | 150 | |
| V-EE-EC1 | SS-T65 Thermal Service (1" Ball valve) | -53 | 148 | 2200 | L-60 Series Reinforced PEEK |
| V-EE-EC2 | SS-T65 Thermal Service (1" Ball valve) | -53 | 148 | 2200 | L-60 Series Reinforced PEEK |
| V-EE-EC3 | SS-T65P Peek Regular Service (1" Ball valve) | -28 | 37 | 2200 | PEEK |
| V-EE-EC4 | SS-T65P Peek Regular Service (1" Ball valve) | -28 | 37 | 2200 | PEEK |
| V-EE-EV | SS-68TW32T65-3ENLA220C5S6 | -20 | 121 | 880 | Reinforced PTFE |
| V-EE-B1 | SS-44XS6-1466 | -53 | 148 | 3000 | Modified PTFE |
| V-EE-B2 | SS-44XS6-1466 | -53 | 148 | 3000 | Modified PTFE |
| V-ER-A | SS-43GS6-1466 | -53 | 148 | 3000 | Modified PTFE |
| V-ER-B | SS-44XS6-1466 | -53 | 148 | 3000 | Modified PTFE |
| V-ER-C | SS-63TF6 | -28 | 232 | 2500 | PTFE |
| V-ER-N | SS-42GS4-1466 | -53 | 148 | 3000 | Modified PTFE |
| V-ES-A1 | 3/8" OSS Compression Ball Valve | | | 1000 | PTFE |
| V-ES-A2 | 3/8" OSS Compression Ball Valve | | | 1000 | PTFE |
| V-ES-B1 | SS-43GS6-1466 | -53 | 148 | 3000 | Modified PTFE |
| V-ES-B2 | SS-43GS6-1466 | -53 | 148 | 3000 | Modified PTFE |
| V-ES-C1 | 3/8" OSS Compression Ball Valve | | | 1000 | PTFE |
| V-ES-C2 | 3/8" OSS Compression Ball Valve | | | 1000 | PTFE |
| V-ES-EE | SS-SS4-VH-1466 | -23 | 204 | 2000 | FKM |
| V-ET-B | SS-43GS6-1466 | -53 | 148 | 3000 | Modified PTFE |
| V-EW-A1 | SS-44XS6-1466 | -53 | 148 | 3000 | Modified PTFE |
| V-EW-A2 | SS-44XS6-1466 | -53 | 148 | 3000 | Modified PTFE |
| V-EW-B1 | SS-43GS6-1466 | -53 | 148 | 3000 | Modified PTFE |
| V-EW-B2 | SS-43GS6-1466 | -53 | 148 | 3000 | Modified PTFE |
| V-EW-C1 | SS-43GS6-1466 | -53 | 148 | 3000 | Modified PTFE |
| V-EW-C2 | SS-43GS6-1466 | -53 | 148 | 3000 | Modified PTFE |
| V-EW-E1 | SS-43GS6-1466 | -53 | 148 | 3000 | Modified PTFE |
| V-EW-E2 | SS-43GS6-1466 | -53 | 148 | 3000 | Modified PTFE |
| V-EW-F1 | SS-43GS6-1466 | -53 | 148 | 3000 | Modified PTFE |
| V-EW-F2 | SS-43GS6-1466 | -53 | 148 | 3000 | Modified PTFE |

SYSTEMS AND METHODS FOR PROCESSING ESSENTIAL OILS

BACKGROUND

Technical Field

The present disclosure relates generally to systems for processing essential oils, and more particularly to systems for separating and purifying essential oils from other plant material.

Description of the Related Art

Essential oils generally include concentrated liquids and volatile aromatic compounds derived from plants. Essential oils have been used for centuries and are used today in a wide variety of commercial applications, including in perfumes and soaps. A variety of systems and methods for obtaining essential oils from plant material are available today, although some of these systems and methods suffer from one or more drawbacks. Thus, there is a continuing need for improvements in the field.

BRIEF SUMMARY

A system for separating oils from a solvent may be summarized as comprising: an outer housing including an inner chamber, wherein a pressure within the inner chamber is less than 120 Torr; a plate located within the inner chamber, wherein a temperature of the plate is between 70 and 120 degrees Fahrenheit; a source of a mixture of the oils and the solvent, the source positioned to supply the mixture onto the plate; a surface exposed to the inner chamber, wherein a temperature of the surface is below 40 degrees Fahrenheit; a first collecting conduit positioned to receive the oils from the plate and carry the oils out of the outer housing; and a second collecting conduit positioned to receive the solvent from the surface and carry the solvent out of the outer housing. The surface may be an inner surface of the outer housing. The mixture of the oils and the solvent may be located on the plate and the oils may be essential oils of cannabis plant material.

A method of separating oils from a solvent may be summarized as comprising: drawing a vacuum within an inner chamber of an outer housing so that a pressure within the inner chamber of the outer housing is below 120 Torr; heating a plate located within the inner chamber of the housing to above a boiling temperature of the solvent at the pressure within the inner chamber; cooling an inner surface of the outer housing surface exposed to the inner chamber of the outer housing to below the boiling temperature of the solvent at the pressure within the inner chamber; supplying a mixture of the oils and the solvent onto the plate and allowing the mixture to run down the plate as the solvent boils out of the mixture and condenses on the cooled surface; carrying the oils out of the outer housing through a first collecting conduit; and carrying the solvent out of the outer housing through a second collecting conduit. Supplying the mixture onto the plate may include spraying the mixture onto a top portion of the plate. The oils may be essential oils of cannabis plant material.

A method of supplying a mixture of oils and a solvent from a holding tank to a system for separating the oils from the solvent may be summarized as comprising: closing a first valve controlling an inlet conduit to the holding tank to prevent backflow out of the holding tank; opening a second valve controlling an outlet conduit from the holding tank to allow the mixture to flow from the holding tank to the system for separating the oils from the solvent; coupling a source of a pressurized inert gas to the holding tank and opening a third valve so that the pressurized inert gas can flow into the holding tank; and allowing the pressurized inert gas to force the mixture out of the holding tank, through the outlet conduit, and into the system for separating the oils from the solvent. The holding tank may include a release valve to release pressure from the holding tank if the pressure within the tank rises above a threshold level. The oils may be essential oils of cannabis plant material.

A method of winterizing mixtures of crude oils and a solvent may be summarized as comprising: supplying a first mixture into an inner chamber of a first winterization vessel and a coolant into an outer chamber of the first winterization vessel; allowing a temperature of the first mixture to decrease until waxes within the first mixture solidify; and supplying a pressurized inert gas into the inner chamber of the first winterization vessel, thereby forcing the first mixture through at least two filters within the inner chamber of the first winterization vessel and out of the inner chamber of the first winterization vessel.

The method may further comprise: supplying a second mixture into an inner chamber of a second winterization vessel and the coolant into an outer chamber of the second winterization vessel, wherein the supplying of the second mixture occurs a first amount of time after the supplying of the first mixture; allowing a temperature of the second mixture to decrease until waxes within the second mixture solidify; and supplying the pressurized inert gas into the inner chamber of the second winterization vessel, thereby forcing the second mixture through at least two filters within the inner chamber of the second winterization vessel and out of the inner chamber of the second winterization vessel.

The method may further comprise: supplying a third mixture into an inner chamber of a third winterization vessel and the coolant into an outer chamber of the third winterization vessel, wherein the supplying of the third mixture occurs a second amount of time after the supplying of the second mixture, wherein the second amount of time is the same as the first amount of time; allowing a temperature of the third mixture to decrease until waxes within the third mixture solidify; and supplying the pressurized inert gas into the inner chamber of the third winterization vessel, thereby forcing the third mixture through at least two filters within the inner chamber of the third winterization vessel and out of the inner chamber of the third winterization vessel.

The method may further comprise: supplying a fourth mixture into the inner chamber of the first winterization vessel and the coolant into the outer chamber of the first winterization vessel, wherein the supplying of the fourth mixture occurs a third amount of time after the supplying of the third mixture, wherein the third amount of time is the same as the first amount of time and as the second amount of time; allowing the temperature of the fourth mixture to decrease until waxes within the fourth mixture solidify; and supplying the pressurized inert gas into the inner chamber of the first winterization vessel, thereby forcing the fourth mixture through the at least two filters within the inner chamber of the first winterization vessel and out of the inner chamber of the first winterization vessel.

The method may further comprise cleaning the at least two filters within the inner chamber of the first winterization vessel after supplying the first mixture into the inner chamber of the first winterization vessel and before supplying the fourth mixture into the inner chamber of the first winterization vessel. The crude oils may include essential oils of cannabis plant material.

A method of removing waxes from crude oils may be summarized as comprising: introducing crude oils into a first vessel; mixing a solvent with the crude oils at a temperature above 90 degrees Fahrenheit in the first vessel; pressurizing the first vessel with an inert gas to advance the mixture into a second vessel; cooling the second vessel and the mixture to a temperature below 32 degrees Fahrenheit until the waxes in the mixture solidify; pressurizing the second vessel with an inert gas to advance the mixture through filters that trap a portion of the waxes and into a third vessel; warming the third vessel and the filtered mixture to a temperature above 68 degrees Fahrenheit; pressurizing the third vessel with an inert gas to advance the mixture into a fourth vessel that has a pressure of less than 120 Torr; introducing the mixture onto a tilted plate that is heated above the boiling point for the solvent within the fourth vessel; collecting the oil from a bottom of the plate through a first conduit out of the fourth vessel; and condensing the solvent and collecting the condensed solvent through a second conduit out of the fourth vessel.

BRIEF DESCRIPTION OF THE SEVERAL VIEWS OF THE DRAWINGS

FIG. 31A illustrates an upper outer left portion of a schematic view of a system for separating and purifying essential oils from other plant material.

FIG. 31I illustrates a legend of the schematic view of the system of FIGS. 31A-31H for separating and purifying essential oils from other plant material.

FIG. 31J illustrates a portion of the bill of materials of the schematic view of the system of FIGS. 31A-31H for separating and purifying essential oils from other plant material.

FIG. 31K illustrates another portion of the bill of materials of the schematic view of the system of FIGS. 31A-31H for separating and purifying essential oils from other plant material.

DETAILED DESCRIPTION

Figure 1:
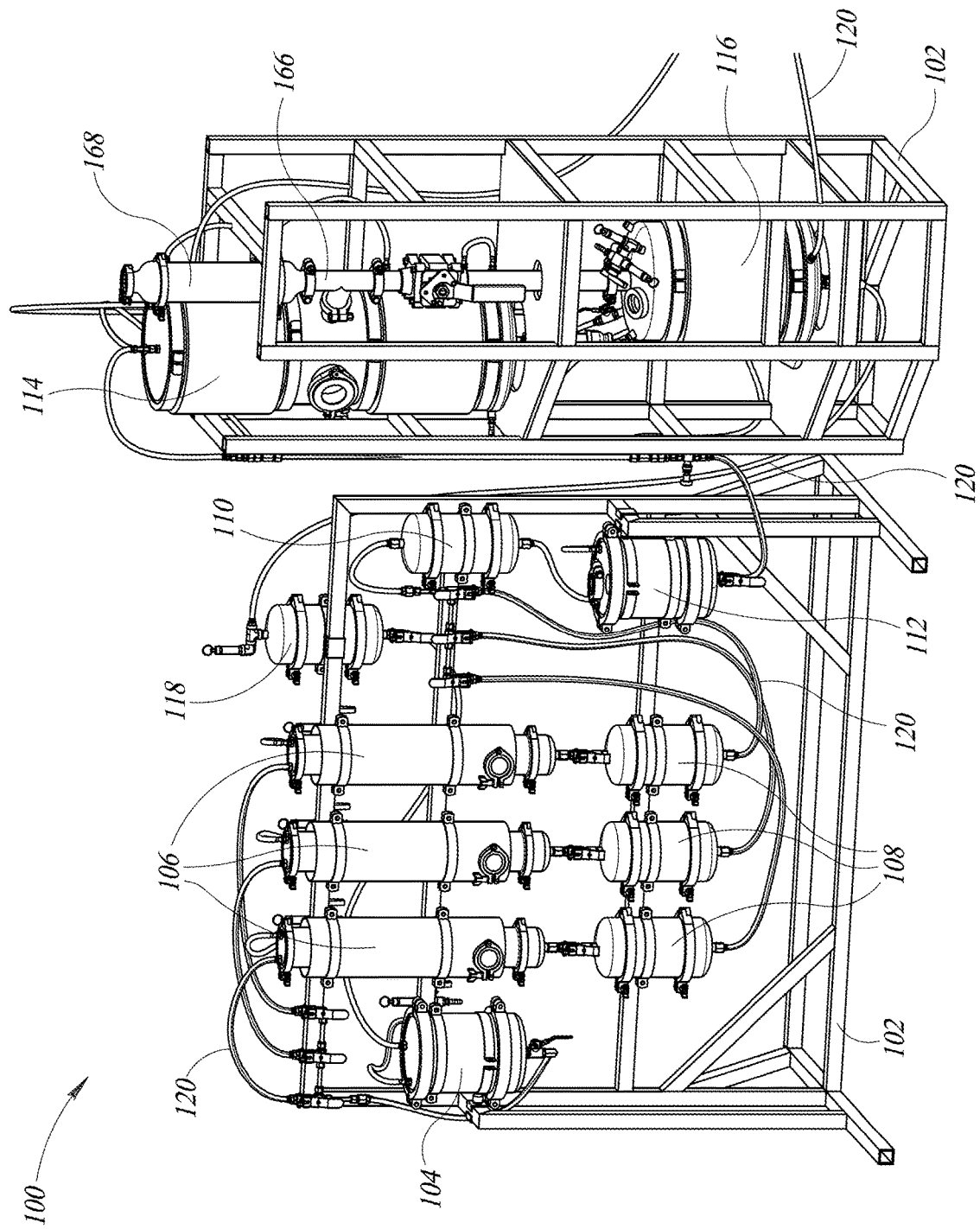
FIG. 1 illustrates a front, top, and right-side perspective view of a system for separating and purifying essential oils from other plant material.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment are used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein, such as of temperatures or pressures, can be approximations wherein the actual numerical values can vary by up to 1, 2, 5, 10, 15 or more percent from the stated, approximate dimensions or other numerical values.

Figure 2:
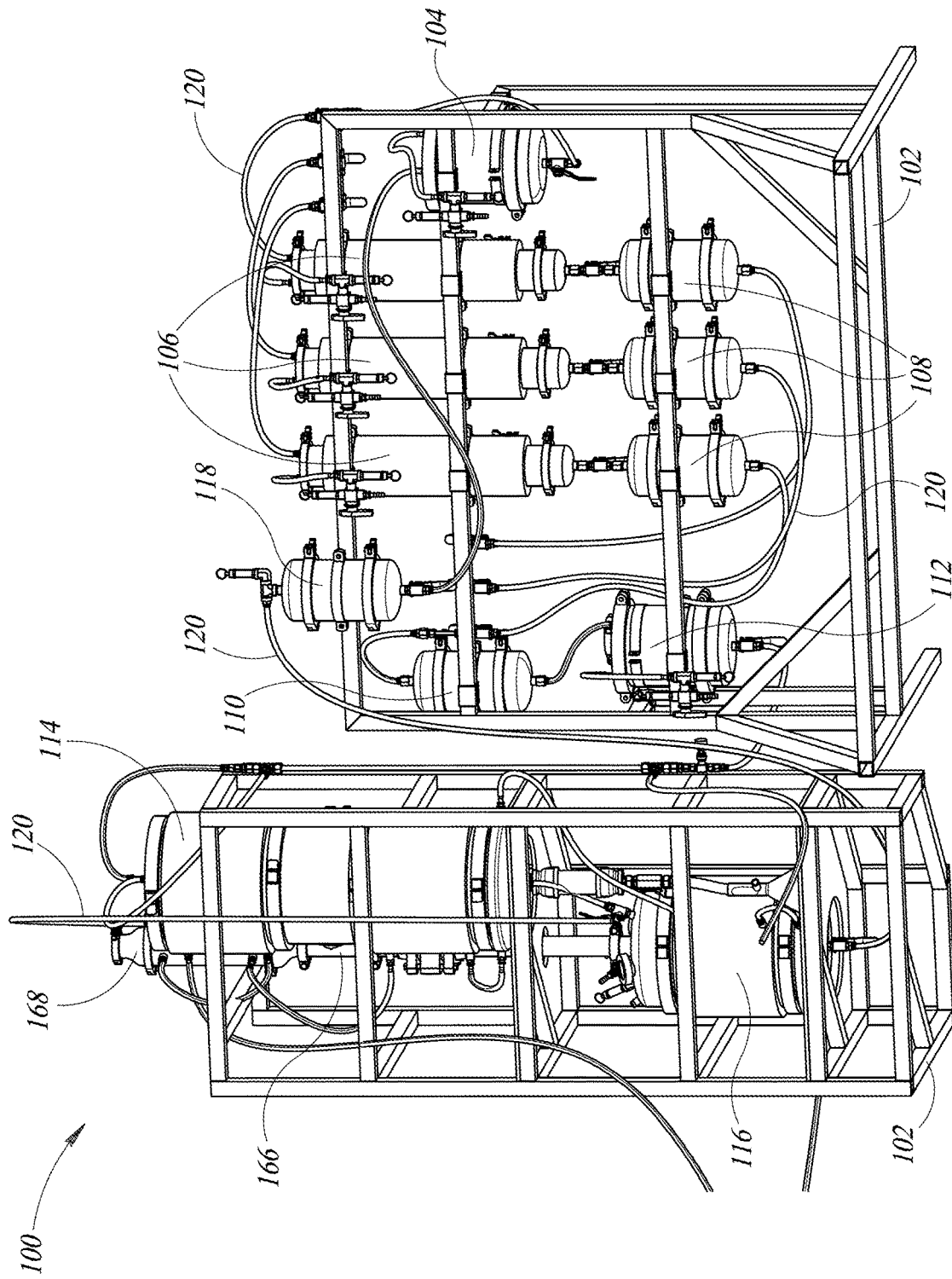
FIG. 2 illustrates a rear, bottom, and left-side perspective view of the system of FIG. 1.
Figure 3:
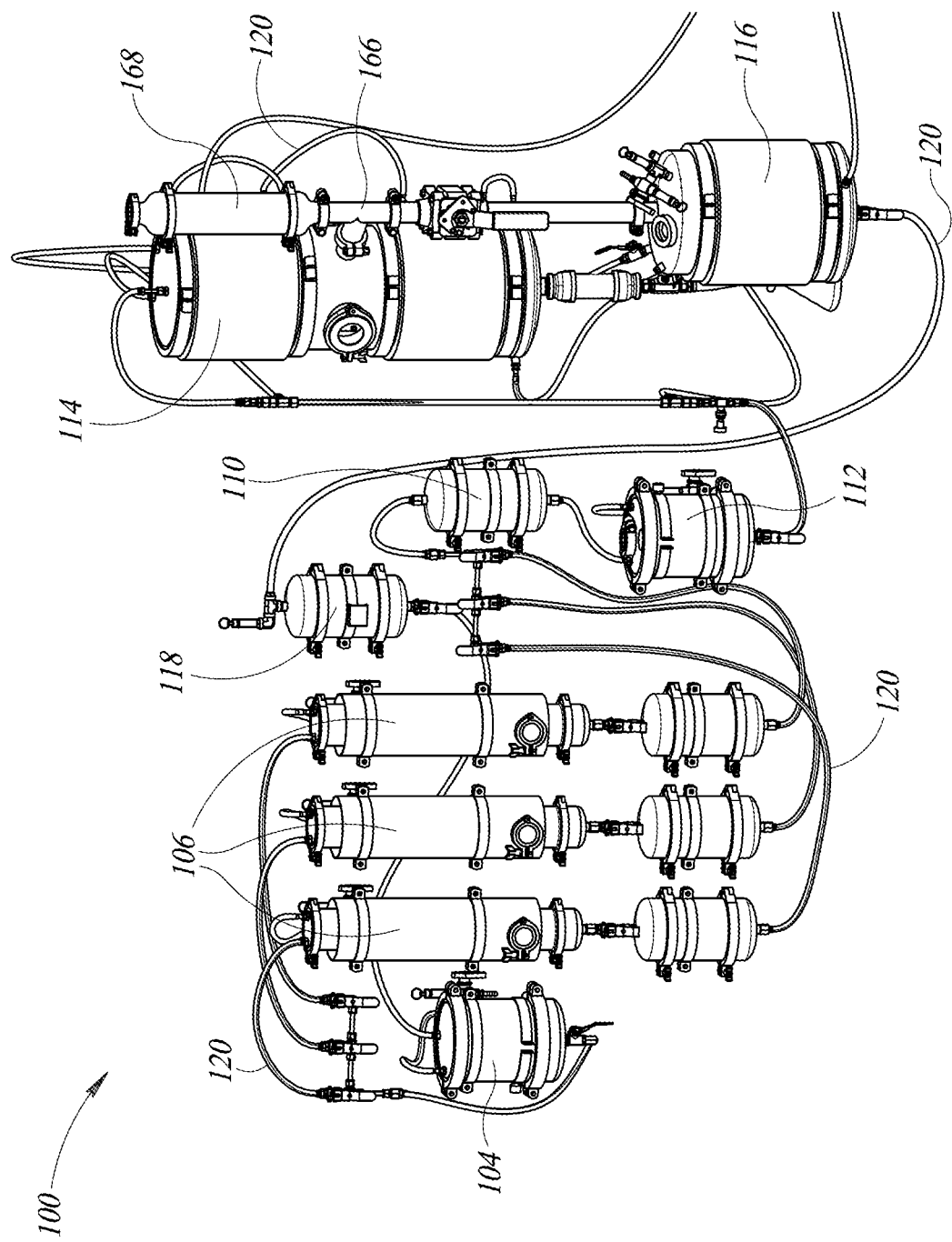
FIG. 3 illustrates a front, top, and right-side perspective view of the system of FIGS. 1 and 2 with a frame thereof removed to more clearly illustrate other components.
Figure 4:
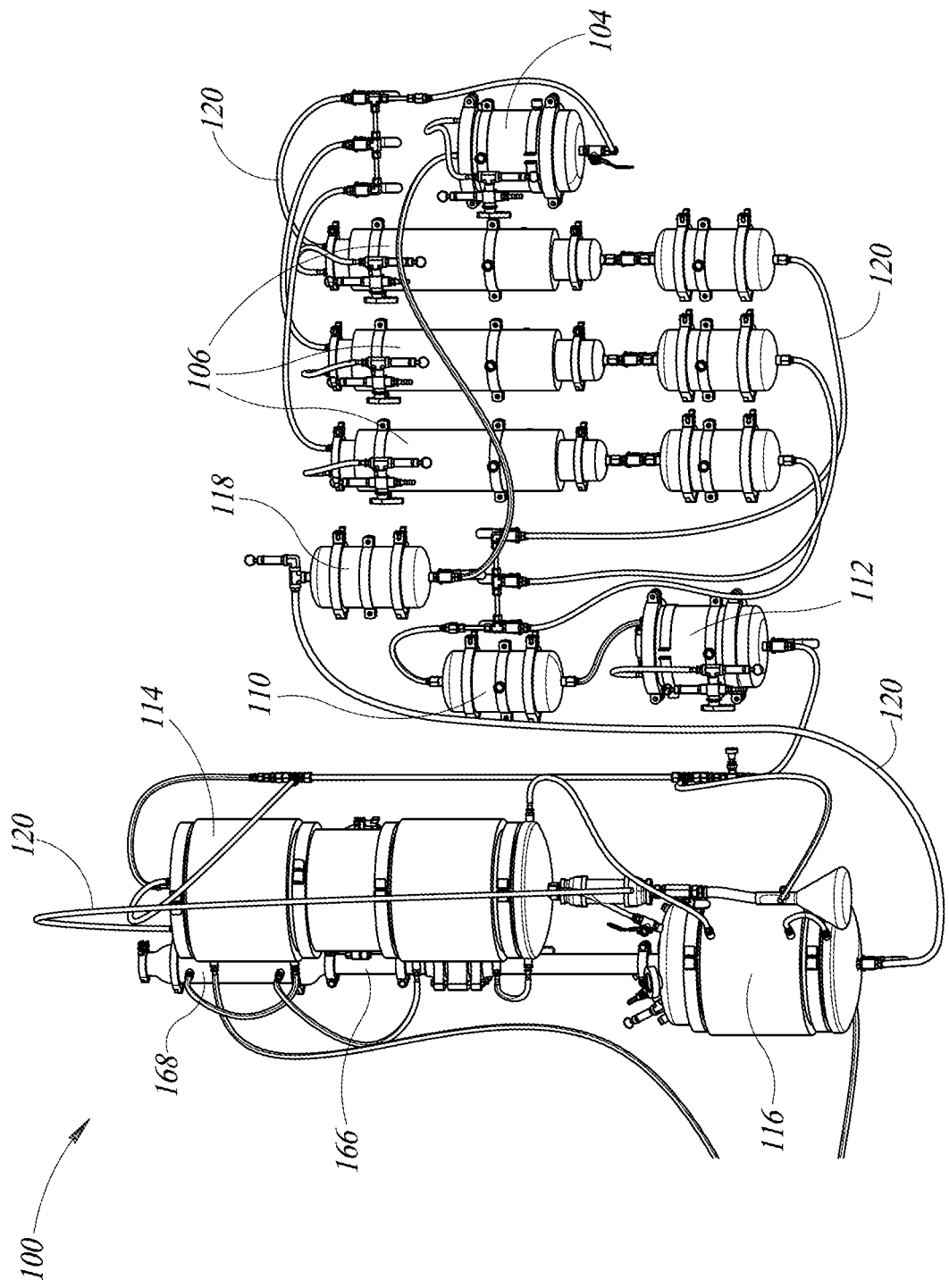
FIG. 4 illustrates a rear, bottom, and left-side perspective view of the system of FIGS. 1-3 with the frame thereof removed to more clearly illustrate other components.

FIGS. 1 and 2 illustrate a system 100 for separating and purifying botanical or essential oils from other botanical or plant matter or material. In some implementations, the plant material can be cannabis plant material and the essential oils can be essential oils, including terpenes, terpenoids, pinenes, and D-limonene of the cannabis plant. In other implementations, however, the plant material can be any plant material from which desirable essential oils can be extracted. The system 100 includes a frame 102 that supports, is coupled to, and holds a variety of other components of the system 100 in place with respect to one another. FIGS. 3 and 4 illustrate the system 100 without the frame 102, to more clearly illustrate those other components. As illustrated in FIGS. 1-4, the system 100 includes an initial mixing tank 104. An operator of the system 100 can supply initial raw materials such as plant material and chemical compounds to the mixing tank 104, within which the initial steps of a method of processing, separating, and purifying essential oils from the plant material can take place.

As also illustrated in FIGS. 1-4, the system 100 includes a set of three winterization columns or vessels 106. Compounds extracted from the plant material in the mixing tank 104, as well as any other compounds supplied by the operator to the mixing tank 104, can be supplied from the mixing tank 104 to the winterization vessels 106, within which the compounds can be chilled, cooled, and/or frozen, and within which the compounds can be filtered (which can be referred to herein as "winterization" or being "winterized"). As also illustrated in FIGS. 1-4, the system 100 includes a set of three filtering vessels 108. Compounds can be supplied from the winterization vessels 106 to the filtering vessels 108, within which the compounds can be further filtered.

As also illustrated in FIGS. 1-4, the system 100 includes a fine filtration or filtering vessel 110. Compounds can be supplied from the filtering vessels 108 to the fine filtering vessel 110, within which the compounds can be further filtered. As also illustrated in FIGS. 1-4, the system 100 includes a holding tank 112. Compounds can be supplied from the fine filtering vessel 110 to the holding tank 112, within which the compounds can be stored and held for subsequent use and processing. As also illustrated in FIGS. 1-4, the system 100 includes an evaporator 114. Compounds can be supplied from the holding tank 112 to the evaporator 114, within which constituent components of the plant material can be separated from other compounds via evaporative separation techniques, as described elsewhere herein.

As also illustrated in FIGS. 1-4, the system 100 includes a solvent reservoir 116. Some of the constituent components separated by the evaporator 114 can be supplied from the evaporator 114 to the solvent reservoir 116, within which the constituent components can be stored and held for later use and processing. As also illustrated in FIGS. 1-4, the system 100 includes a filtering vessel 118. Some of the constituent components separated by the evaporator 114 and supplied to the solvent reservoir 116 can be supplied from the solvent reservoir 116 to the filtering vessel 118, within which the constituent components can be filtered for later use and processing. As also illustrated in FIGS. 1-4, the system 100 includes a series of pipes or conduits 120, which can be used to carry any of the compounds or materials described herein from one component of the system 100 to another component of the system 100, as well as to carry other compounds, materials, and fluids to or away from the components of the system 100 to facilitate their operation. The conduits 120 themselves can be standard commercially available conduits, such as ⅜-inch diameter pipe. The conduits 120 and their operation are described further elsewhere herein.

Figure 5:
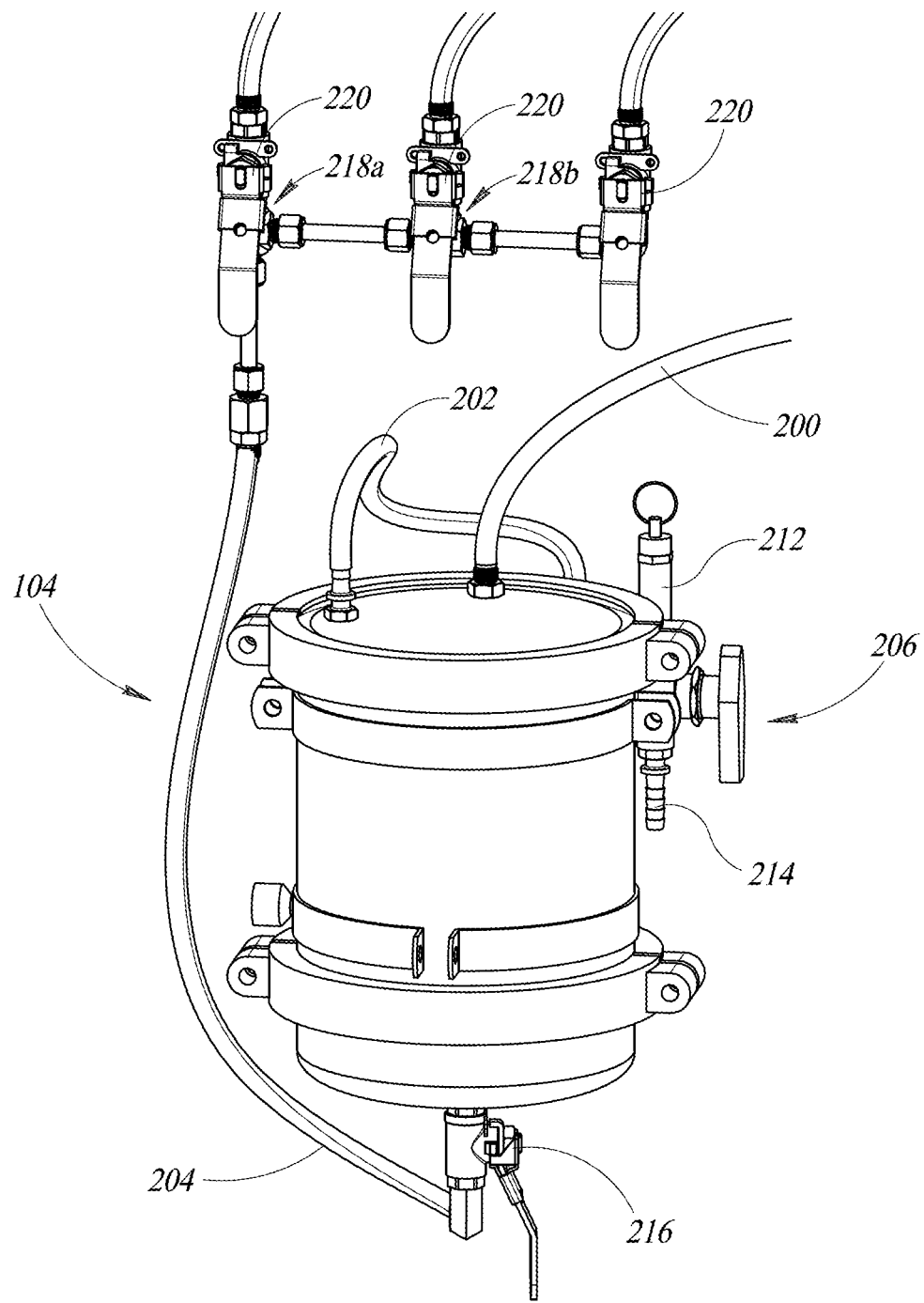
FIG. 5 illustrates a front, top, and right-side perspective view of an initial mixing tank of the system of FIGS. 1-4.
Figure 6:
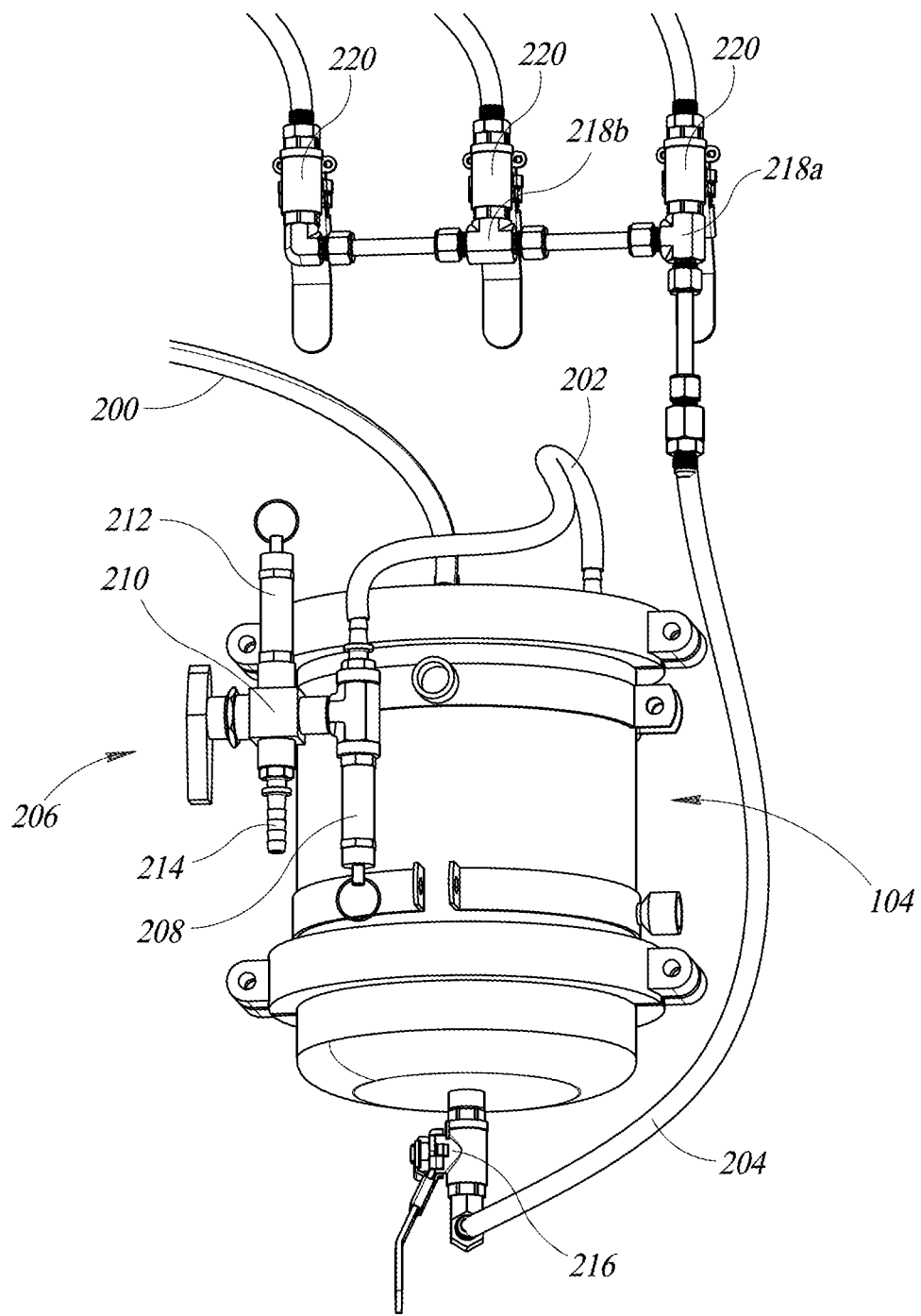
FIG. 6 illustrates a rear, bottom, and left-side perspective view of the initial mixing tank of FIG. 5.

FIGS. 5 and 6 illustrate front and rear perspective views, respectively, of the initial mixing tank 104. To begin processing plant material to extract and purify essential oils therefrom, an operator can open the mixing tank 104 and place the plant material and other compounds therein. For example, the operator can supply a crude oil previously derived from raw plant materials into the mixing tank 104. In some implementations, the crude oil can be obtained by mixing raw plant material with a non-polar solvent such as butane or propane, and chilling the mixture in an extractor, which can extract a relatively impure oil from the rest of the plant material. The relatively impure oil can then be processed through a molecular sieve that removes relatively large impurities, such as chlorophyll and other large particulates, as well as water, to obtain the crude oil that is supplied to the mixing tank 104. Such impurities can be discarded once removed from the oil.

The operator can also supply a polar solvent, such as ethanol, D-limonene, or hexane, and which can be an anhydrous solvent, into the mixing tank 104. In some implementations, the crude oil and the solvent can be supplied to the mixing tank 104 by hand, and/or from a pre-mixing device that performs some initial mixing operations. In some implementations, the crude oil and the solvent can be supplied to the mixing tank 104 through a venturi device. For example, the crude oil and the solvent can initially be mixed in a 1:1 ratio. A stream of pure solvent can be supplied into the mixing tank 104 through a venturi device, and the 1:1 mixture of the crude oil and the solvent can be injected into the venturi device and taken up by the stream of pure solvent in accordance with the venturi effect. Such an implementation can allow the crude oil and the solvent to be supplied to the mixing tank in a relatively precise ratio.

In some implementations, the crude oil and the solvent can be supplied to the mixing tank 104 in a ratio between 1/6 and 1/10, such as 1/8, oil/solvent. The mixing tank 104 can then be heated to between 60 and 120 degrees Fahrenheit, or between 60 and 105 degrees Fahrenheit, or between 105 and 120 degrees Fahrenheit, or 100 degrees Fahrenheit, or 95 degrees Fahrenheit, or to above 90 degrees Fahrenheit, and the crude oil and the solvent can be mixed within the mixing tank 104 at such elevated temperatures. Such processes can occur at atmospheric pressure and take about half an hour. Once the crude oil and the solvent have been mixed within the mixing tank 104, the mixture can be supplied from the mixing tank 104 to the three winterization vessels 106, such as through the conduits 120, for further processing therein.

Figure 7:
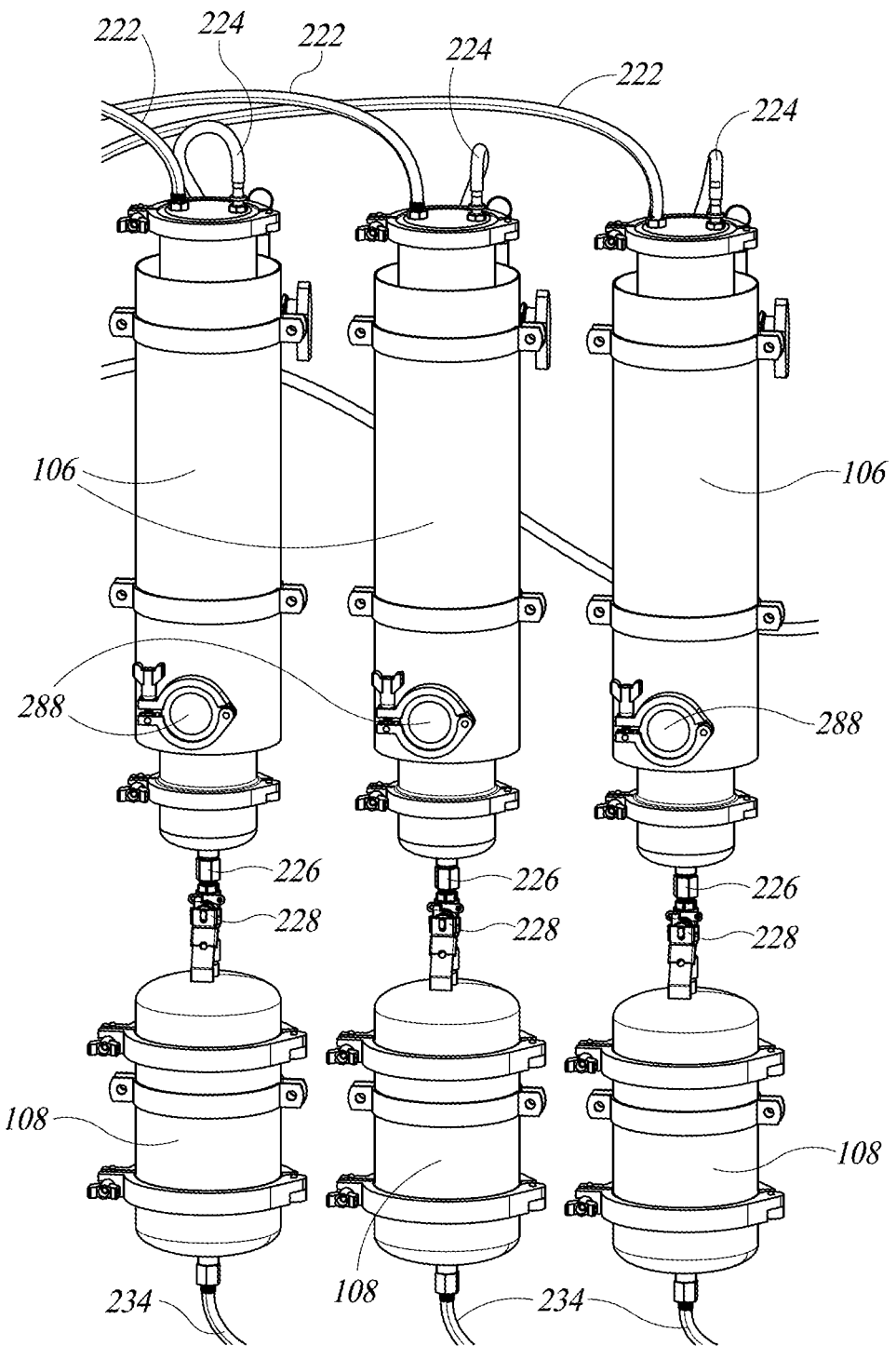
FIG. 7 illustrates a front, top, and right-side perspective view of a set of winterization and filtering vessels of the system of FIGS. 1-4.
Figure 8:
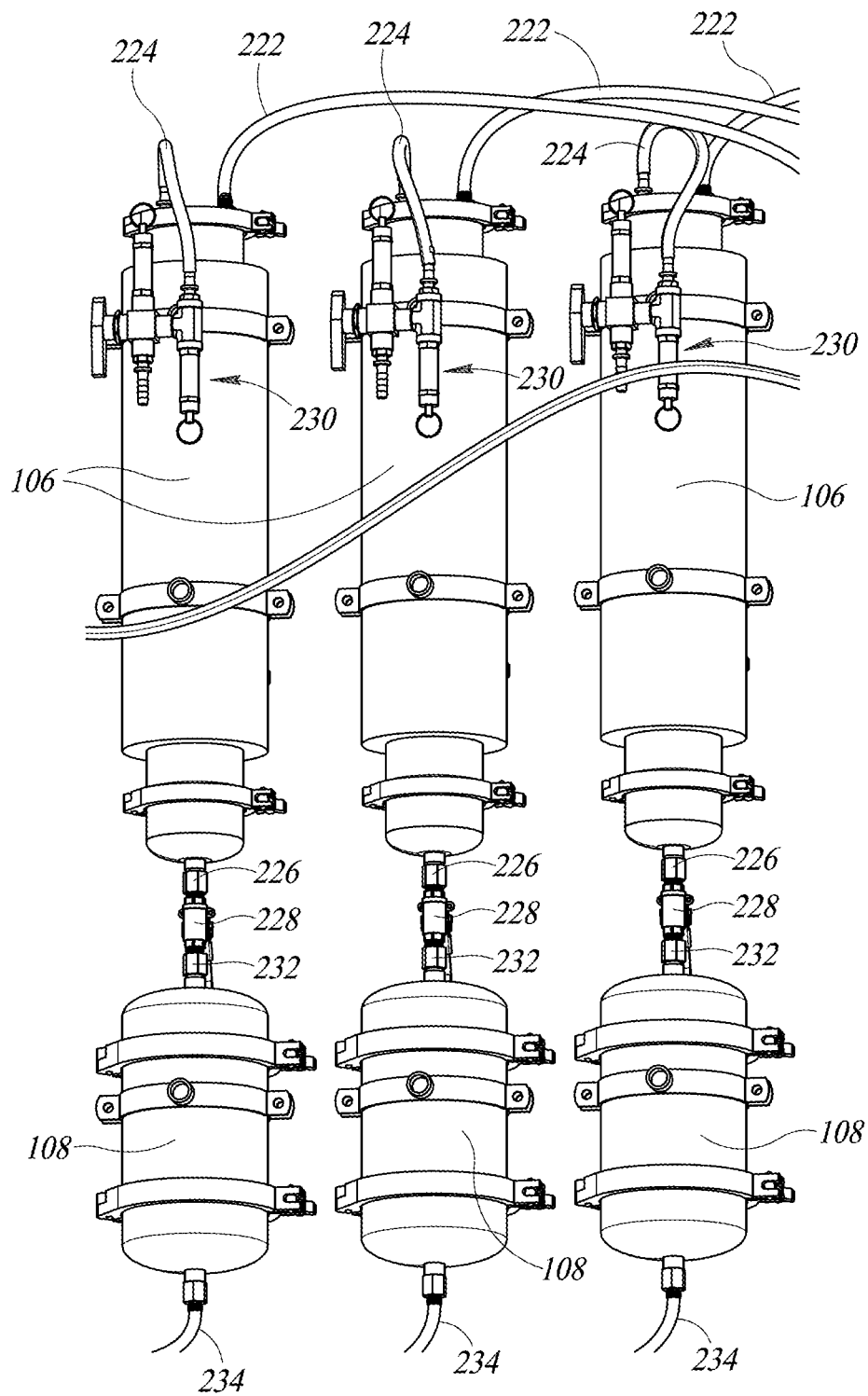
FIG. 8 illustrates a rear, bottom, and left-side perspective view of the set of winterization and filtering vessels of FIG. 7.

FIGS. 7 and 8 illustrate front and rear perspective views, respectively, of the three winterization vessels 106. Each of the vessels 106 can be a double-hulled or "jacketed" vessel including an inner shell, an outer shell, an inner open space or chamber defined within the inner shell, and an outer space or chamber defined between the inner shell and the outer shell, where the outer chamber surrounds the inner chamber. In some implementations, each of the vessels 106 is made of a housing including a plurality of discrete portions thereof, each portion of the vessel 106 having its own distinct outer chamber, the plurality of discrete portions of the housing forming a common inner chamber. Thus, the outer chamber can include a plurality of discrete, distinct, and separated chambers that are physically divided from one another, such that, for example, a coolant can flow through each of such discrete chambers separately, as described further below. In general, references throughout this disclosure to the vessels 106 that are directed to a chamber within the vessel 106, as well as generic references to a chamber within the vessel 106, are directed specifically to the inner chamber within the inner shell of the vessel 106, unless such references specifically refer to the outer chamber of the vessel 106. Each of the winterization vessels 106 can have an overall outer diameter of 4 inches and an overall length of 24 inches, an inner chamber having a capacity to hold 4.75 Liters of the mixture, and an outer chamber having a capacity to hold 6.0 Liters of a coolant. Each of the winterization vessels 106 can have an outer insulating later of neoprene.

To continue processing the mixture of the crude oil and the solvent, the mixture can be supplied to the inner chamber within one of the winterization vessels 106, and a coolant at a relatively low temperature can be supplied to the outer chamber. In some implementations, the coolant can comprise a slurry of isopropyl alcohol and dry ice (solidified carbon dioxide), or a slurry of liquid nitrogen and acetone, such as at a temperature of −137.2 degrees Fahrenheit. In some implementations, the slurry can be continually cycled through the outer chamber. In other implementations, a predetermined amount of slurry can be provided to the outer chamber and held there while the mixture is held in the inner chamber. In either case, the mixture can be held in the inner chamber for a predetermined or desired residence time, such as 2 to 3 hours, or until the mixture reaches a predetermined or desired low temperature, such as below 32 degrees Fahrenheit, or below 15 degrees Fahrenheit, or between −40 and −50 degrees Fahrenheit, or between −40 and −70 degrees Fahrenheit. As the mixture is cooled in this manner, waxes contained or held in the mixture will tend to solidify or congeal before other constituent components of the mixture.

Figure 9:
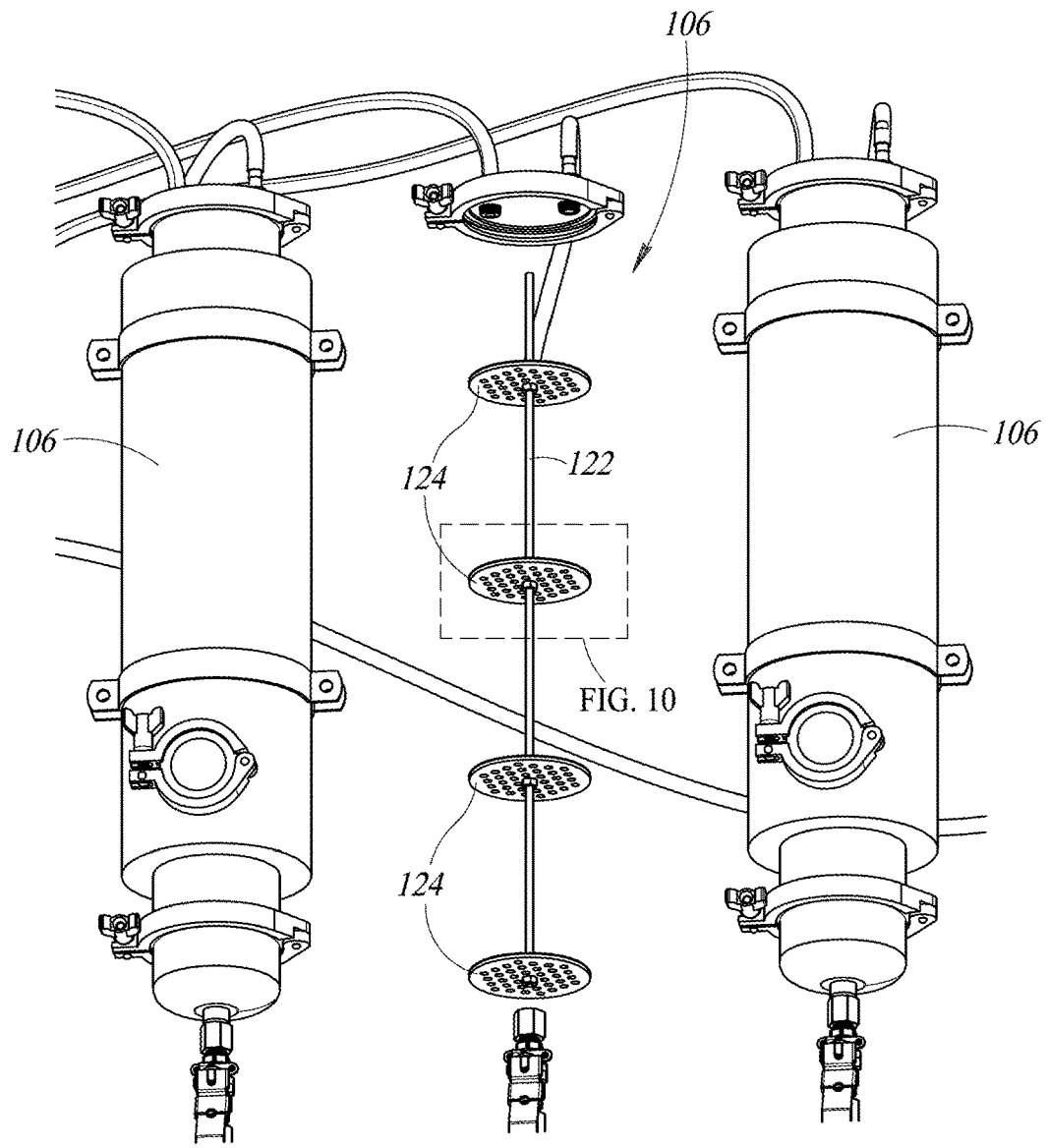
FIG. 9 illustrates a perspective view of the winterization vessels of FIGS. 7 and 8 with outer components thereof removed to illustrate internal components.
Figure 10:
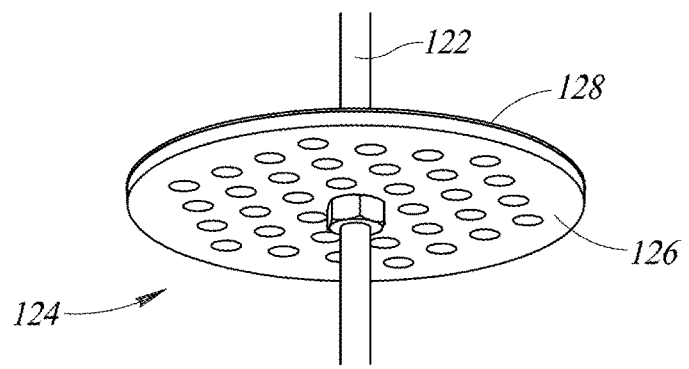
FIG. 10 illustrates a portion of FIG. 9 at a larger scale.

FIG. 9 illustrates a larger perspective view of the winterization vessels 106, with external components of one of the winterization vessels 106 removed to illustrate internal components that reside within the inner chamber thereof. As illustrated in FIG. 9, the internal components of the winterization vessels 106 include an elongate central rod 122 that runs along a central longitudinal axis of the respective vessel 106 concentrically with the inner and outer shell of its double-hulled structure. The internal components also include a set of (e.g., one, two, three, four, five, six, or more) filter systems 124 coupled to the rod 122. FIG. 10 illustrates one of the filter systems 124 at a larger scale for clarity. As illustrated in FIG. 10, each of the filter systems 124 includes a porous circular plate 126 and a circular filter 128 positioned on and supported by the porous plate 126.

The porous plate 126 can extend radially outward from and perpendicular to the rod 122, and can span across the entire diameter of the inner chamber of the respective winterization vessel 106. The porous plate 126 can include a series of holes or openings formed therein to allow the mixture to flow from above the plate 126 to below the plate 126. The filter 128 can sit on top of the plate 126 and filter the solidified or congealed waxes out of the mixture as the mixture passes downward through the winterization vessel 106 and from above the plate 126 to below the plate 126. Each of the filters described herein, including the filters 128 within the winterization vessels 106, can have a respective mesh size, where the mesh sizes of the various filters become finer and finer along a flow path through the system 100. Thus, the filter 128 nearest the top end of each of the winterization vessels 106 can have the coarsest mesh size, which can filter particles greater than 50 microns out of the mixture. In some implementations, a plurality of filters within each of the winterization vessels 106 can each have a mesh size that can filter particles greater than 50 microns out of the mixture. In some implementations, a filter within each of the winterization vessels 106 can have a mesh size that can filter particles greater than 40 microns out of the mixture. In some implementations, the filters described herein can promote nucleation of the waxes within the mixture, increasing the rate at which they solidify or congeal, thereby facilitating their removal from the mixture. In some implementations, any of the filters described herein can be flat discs, cone-shaped, or have three-dimensional mesh structures, or have a combination of such features.

In some implementations, it can be particularly advantageous to use cone-shaped filters with the point or the tip of the cone positioned at the top of the filter, so that the filter is pointing upwards. In particular, the waxes tend to solidify first at the periphery of the inner chamber within the winterization vessels 106, and adjacent their inner wall, and then progressively inward toward the center of the winterization vessels 106. Thus, the waxes will initially be caught at the base of the cone-shaped filters and at the periphery of the inner chamber, leaving a relatively clear flow path through the center of the chamber.

Figure 11:
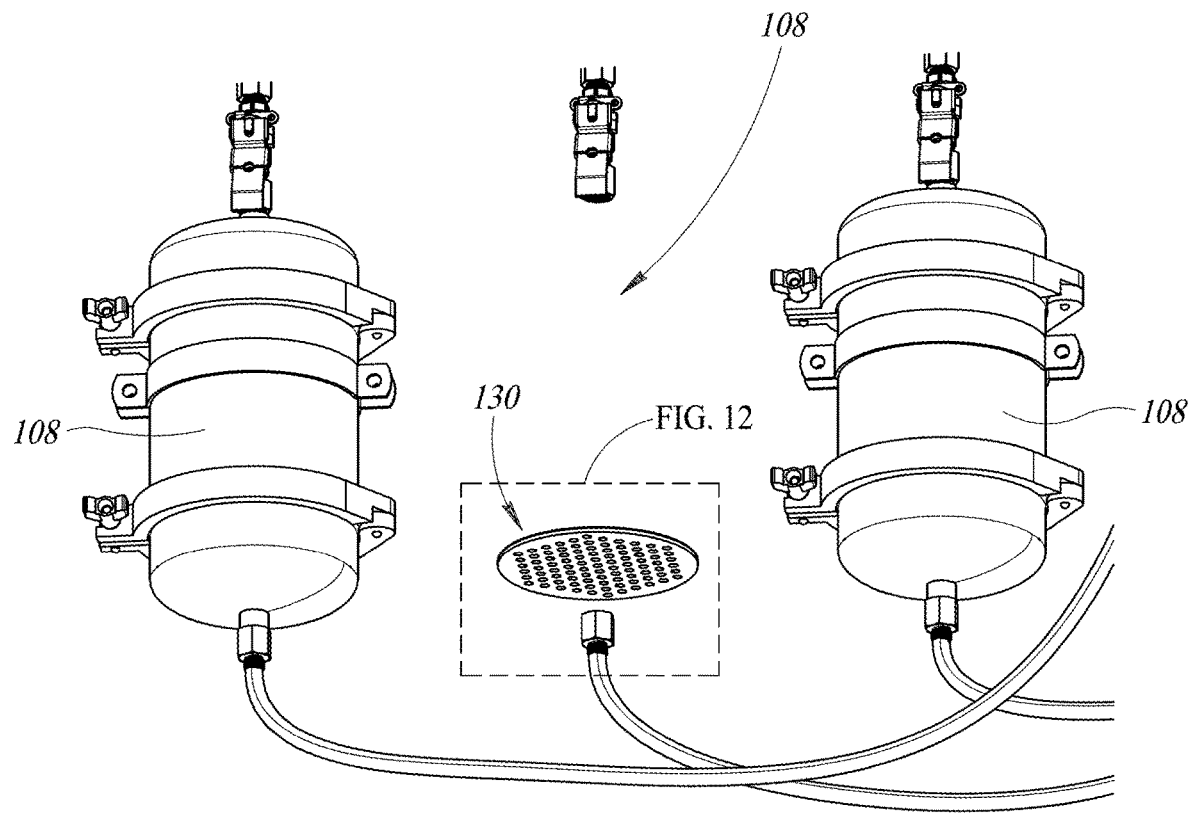
FIG. 11 illustrates a perspective view of the filtering vessels of FIGS. 7 and 8 with outer components thereof removed to illustrate internal components.
Figure 12:
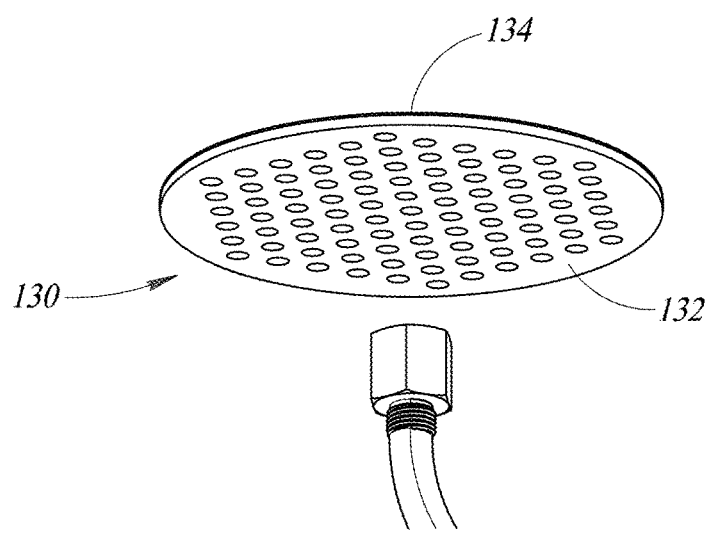
FIG. 12 illustrates a portion of FIG. 11 at a larger scale.

As illustrated in FIGS. 7 and 8, each of the winterization vessels 106 can be coupled to a respective filtering vessel 108. Each filtering vessel 108 can be 6 inches tall and have a diameter of six inches. FIG. 11 illustrates a larger perspective view of the filtering vessels 108, with external components of one of the filtering vessels 108 removed to illustrate internal components that reside within an inner chamber thereof. As illustrated in FIG. 11, the internal components of the filtering vessels 108 include a set of (e.g., one, two, three, four, five, six, or more) filter systems 130. FIG. 12 illustrates one of the filter systems 130 at a larger scale for clarity. As illustrated in FIG. 12, each of the filter systems 130 includes a porous circular plate 132 and a circular filter 134 positioned on and supported by the porous plate 132.

The porous plate 132 can span across the entire diameter of the inner chamber of the respective filtering vessel 108. The porous plate 132 can include a series of holes or openings formed therein to allow the mixture to flow from above the plate 132 to below the plate 132. The filter 134 can sit on top of the plate 132 and continue to filter the solidified or congealed waxes out of the mixture as the mixture passes downward through the filtering vessel 108 and from above the plate 132 to below the plate 132. A first filter 134 within each of the filtering vessels 108 can have a mesh size suitable to filter particles greater than 20 microns out of the mixture. A second filter 134 within each of the filtering vessels 108 can have a mesh size suitable to filter particles greater than 15 microns out of the mixture. A third filter 134 within each of the filtering vessels 108 can have a mesh size suitable to filter particles greater than 10 microns out of the mixture. A fourth filter 134 within each of the filtering vessels 108 can have a mesh size suitable to filter particles greater than 5 microns out of the mixture. In some cases, the filters 134 within each of the filtering vessels 108 can include activated charcoal-based filters.

Figure 13:
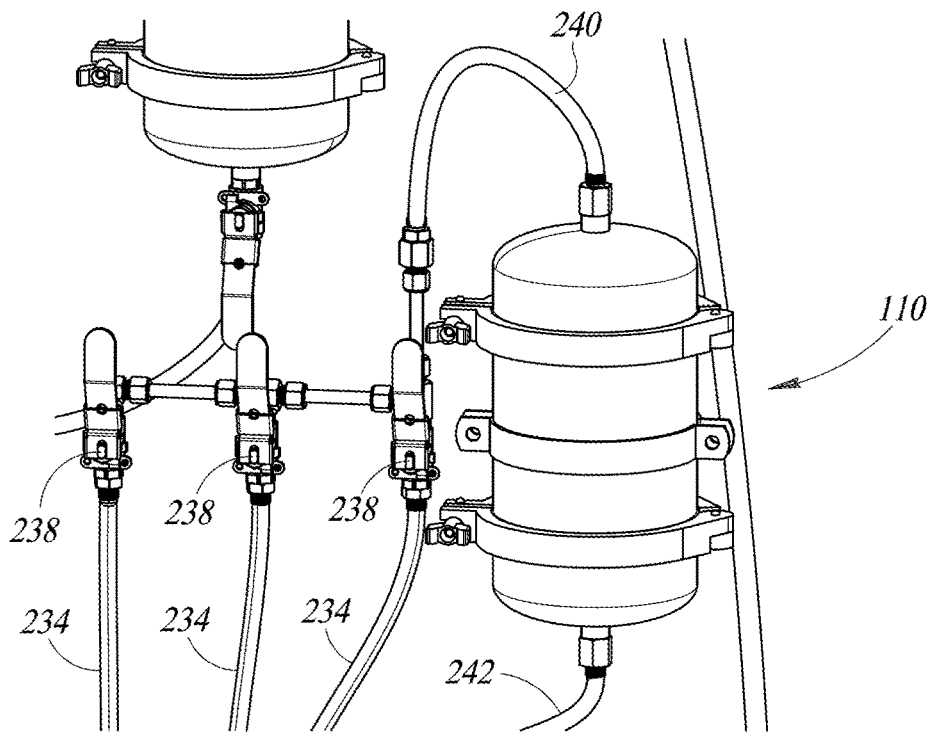
FIG. 13 illustrates a front, top, and right-side perspective view of a filtering vessel of the system of FIGS. 1-4.
Figure 14:
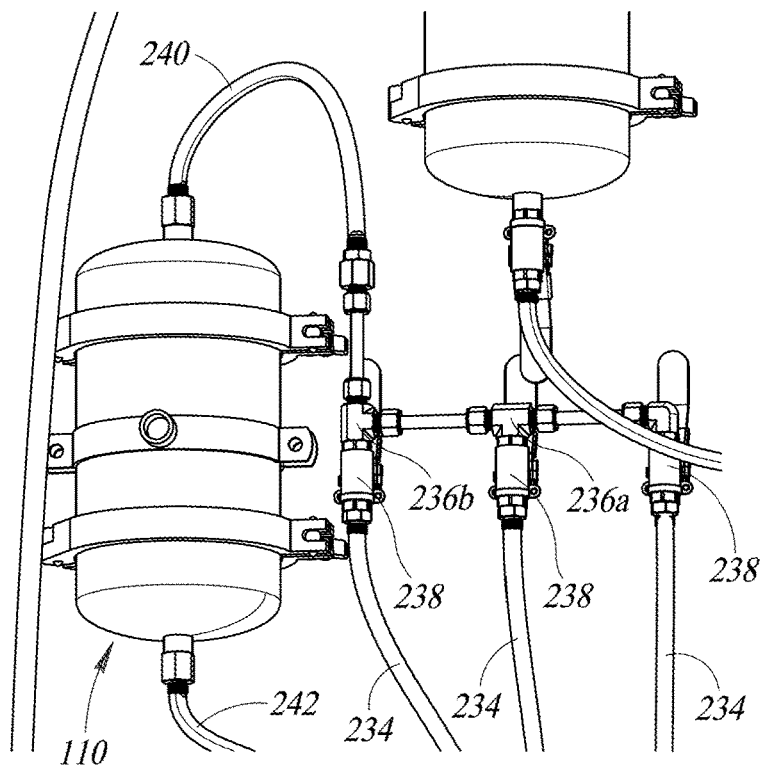
FIG. 14 illustrates a rear, bottom, and left-side perspective view of the filtering vessel of FIG. 13.

FIGS. 13 and 14 illustrate front and rear perspective views, respectively, of a fine filtering vessel 110. The fine filtering vessel 110 can be 6 inches tall and have a diameter of six inches. The fine filtering vessel 110 can be coupled to each of the filtering vessels 108. Internal components of the filtering vessel 110 include a set of (e.g., one, two, three, four, five, six, or more) filter systems similar to the filter systems 130. Thus, each of the filter systems of the fine filtering vessel 110 can include a porous circular plate, similar to the porous plate 132, and a circular filter, similar to the circular filter 134. The filters can continue to filter the waxes out of the mixture as the mixture passes downward through the fine filtering vessel 110. A first filter within the filtering vessel 110 can have a mesh size suitable to filter particles greater than 5 microns out of the mixture. A second filter within the filtering vessel 110 can have a mesh size suitable to filter particles greater than 3 microns out of the mixture. A third filter within the filtering vessel 110 can have a mesh size suitable to filter particles greater than 1 micron out of the mixture. In some implementations, any of the filters described herein can comprise a molecular sieve.

As described above, the system 100 can include a single mixing tank 104, three winterization vessels 106, three filtering vessels 108, and a single fine filtering vessel 110. A mixture can be supplied from the single mixing tank 104 to the three winterization vessels 106 and then to the three filtering vessels 108, and then to the single fine filtering vessel 110. In some implementations, the winterization vessels 106 and the filtering vessels 108 can work simultaneously, concurrently, and in parallel with one another, such that they provide a larger throughput capacity than only a single winterization vessel 106 and a single filtering vessel 108 would by themselves.

In some implementations, the operation of the winterization vessels 106 and the filtering vessels 108 can be staggered. For example, the mixture can be supplied during a first time period from the mixing tank 104 to a first one of the winterization vessels 106 but not the others. The first one of the winterization vessels 106 and its respective filtering vessel 108 can operate to chill and filter the mixture and then supply the mixture to the fine filtering vessel 110. Similarly, the mixture can be supplied during a second time period that is mutually exclusive with and does not overlap the first time period from the mixing tank 104 to a second one of the winterization vessels 106 but not the others. The second one of the winterization vessels 106 and its respective filtering vessel 108 can operate to chill and filter the mixture and then supply the mixture to the fine filtering vessel 110. Similarly, the mixture can be supplied during a third time period that is mutually exclusive with and does not overlap the first and the second time period from the mixing tank 104 to a third one of the winterization vessels 106 but not the others. The third one of the winterization vessels 106 and its respective filtering vessel 108 can operate to chill and filter the mixture and then supply the mixture to the fine filtering vessel 110. In operation, it can take 2 hours to chill and then filter the mixture through one of the winterization vessels 106, and another half an hour to empty, clean, and refill the winterization vessel 106. Thus, a single full cycle of one of the winterization vessels 106 can take two and a half hours. Thus, the operation of each of the winterization vessels 106 can be offset by 50 minutes from each of the others.

As any one of the winterization vessels 106 and its respective filtering vessel 108 is being supplied with the mixture, chilling and filtering the mixture, and/or supplying the mixture to the fine filtering vessel 110, the other winterization vessels 106 and their respective filtering vessels 108 can have maintenance performed, such as to clean or replace their filters. In some implementations, such cleaning or replacement of the filters can occur after every time, or every other time, or every third time, the mixture passes through the winterization vessel 106 and its respective filtering vessel 108, or after a predetermined or desired period of time, or after a predetermined or desired number of cycles, or when the winterization vessel 106 and/or its filtering vessel 108 becomes clogged or inoperative. In some implementations, finer meshes located downstream of relatively coarser meshes are cleaned or replaced less frequently than the relatively coarser meshes. In some implementations, the filters can be reusable wire mesh filters and can be completely cleaned by a simple rinsing process. The staggering of the operation of the three winterization vessels 106 and the three filtering vessels 108 can assist in improving, increasing, or maximizing the uptime or the operation time of the evaporator 114.

Figure 15:
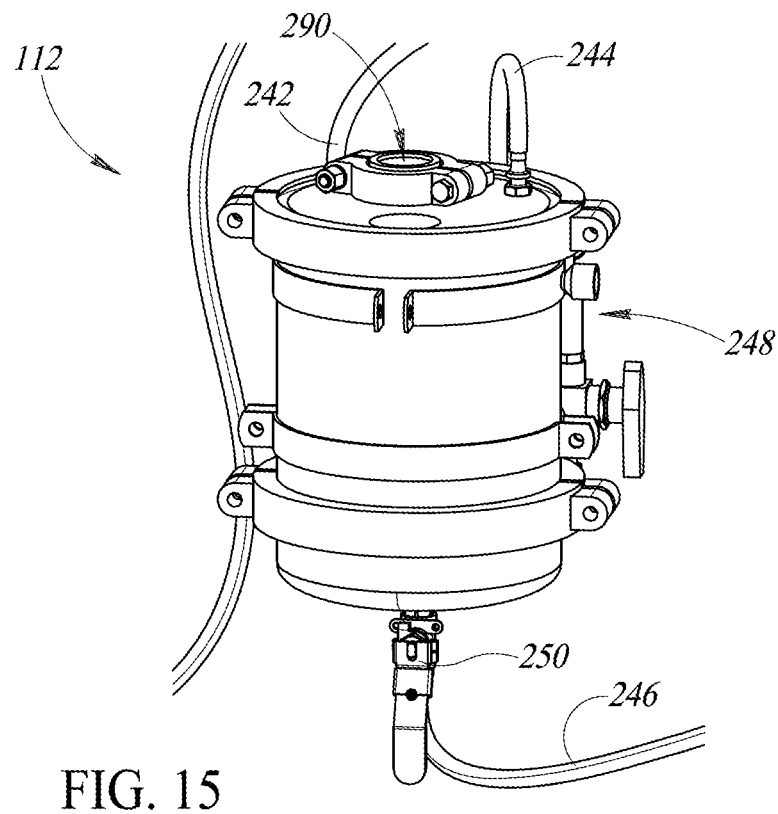
FIG. 15 illustrates a front, top, and right-side perspective view of a holding tank of the system of FIGS. 1-4.
Figure 16:
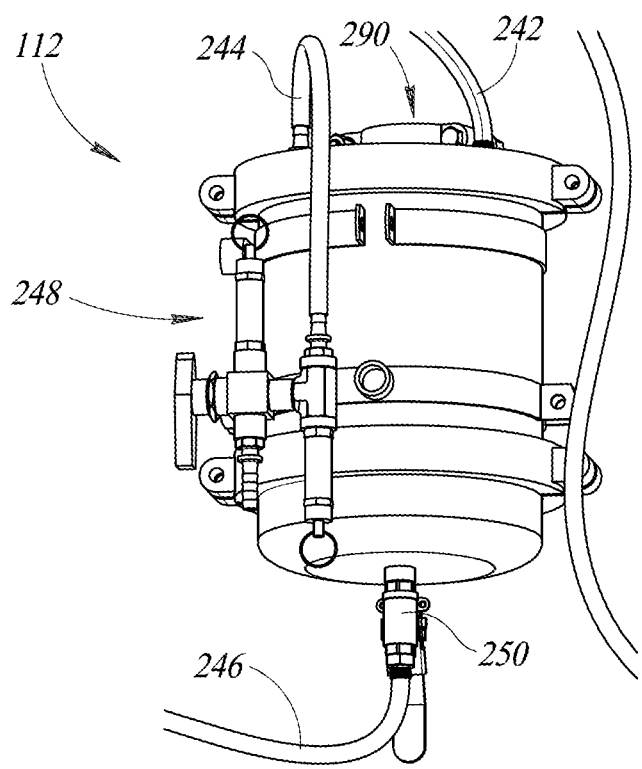
FIG. 16 illustrates a rear, bottom, and left-side perspective view of the holding tank of FIG. 15.

FIGS. 15 and 16 illustrate front and rear perspective views, respectively, of a holding tank 112. The holding tank 112 can be coupled to the fine filtering vessel 110. The mixture, having been filtered, or "de-waxed" by the operation of the winterization vessels 106, the filtering vessels 108, and the fine filtering vessel 110, can be supplied from the fine filtering vessel 110 to the holding tank 112 for storage for later use and processing. For example, the filtered mixture can be supplied to the holding tank 112 through a ⅜-inch diameter conduit at a rate of about 4.5 inches per second for 20 minutes for each cycle of each of the winterization vessels 106. The holding tank 112 can thus provide a reservoir of the de-waxed mixture, and can allow the mixture to return to an environmental, ambient, or room temperature, which can be between 55 and 90 degrees Fahrenheit, or above 68 degrees Fahrenheit, or 70 degrees Fahrenheit. Providing the reservoir of the de-waxed mixture can also facilitate fine flow control of the de-waxed mixture from the holding tank 112 to the evaporator 114.

Figure 17:
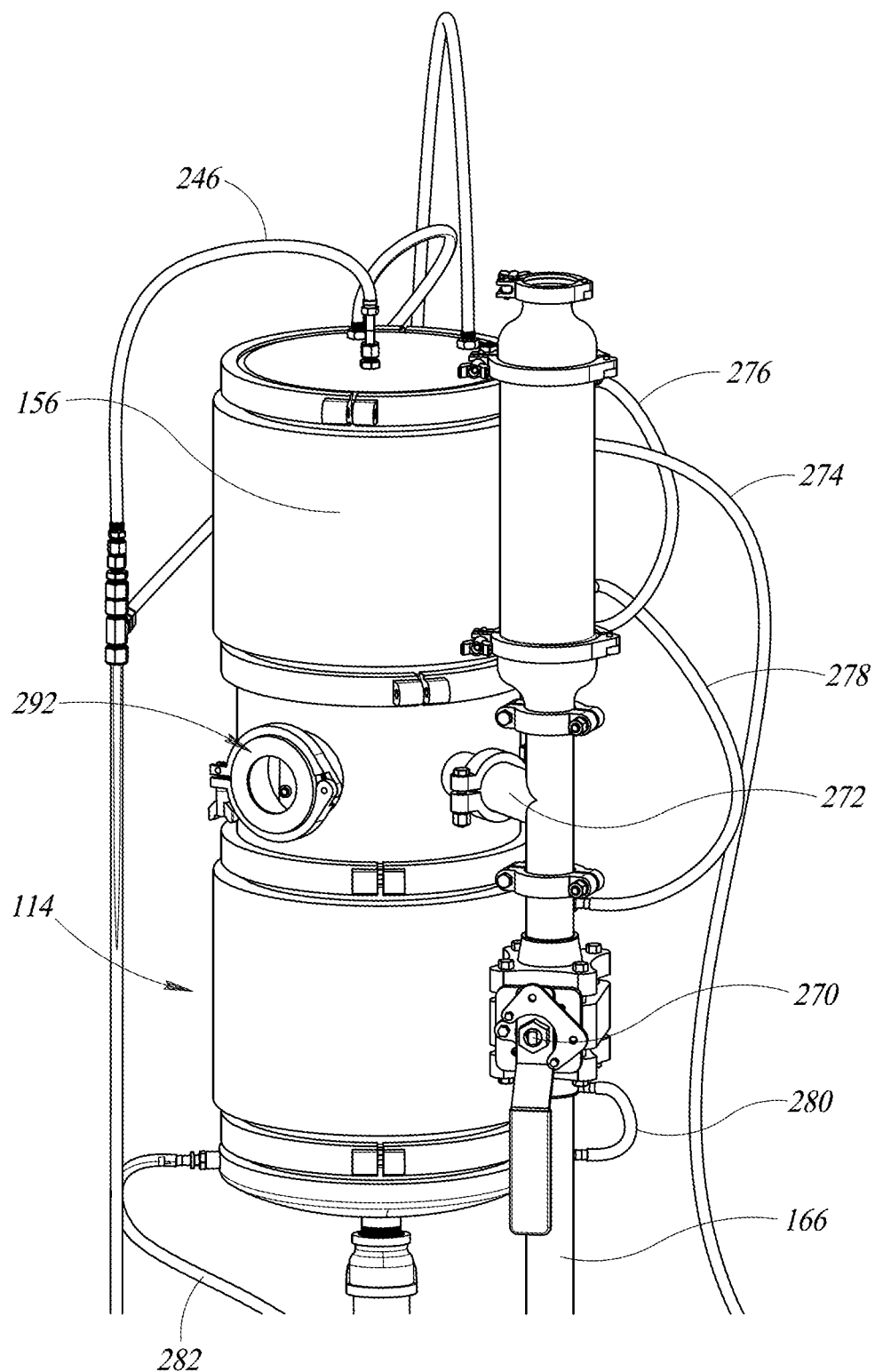
FIG. 17 illustrates a front, top, and right-side perspective view of an evaporator of the system of FIGS. 1-4.
Figure 18:
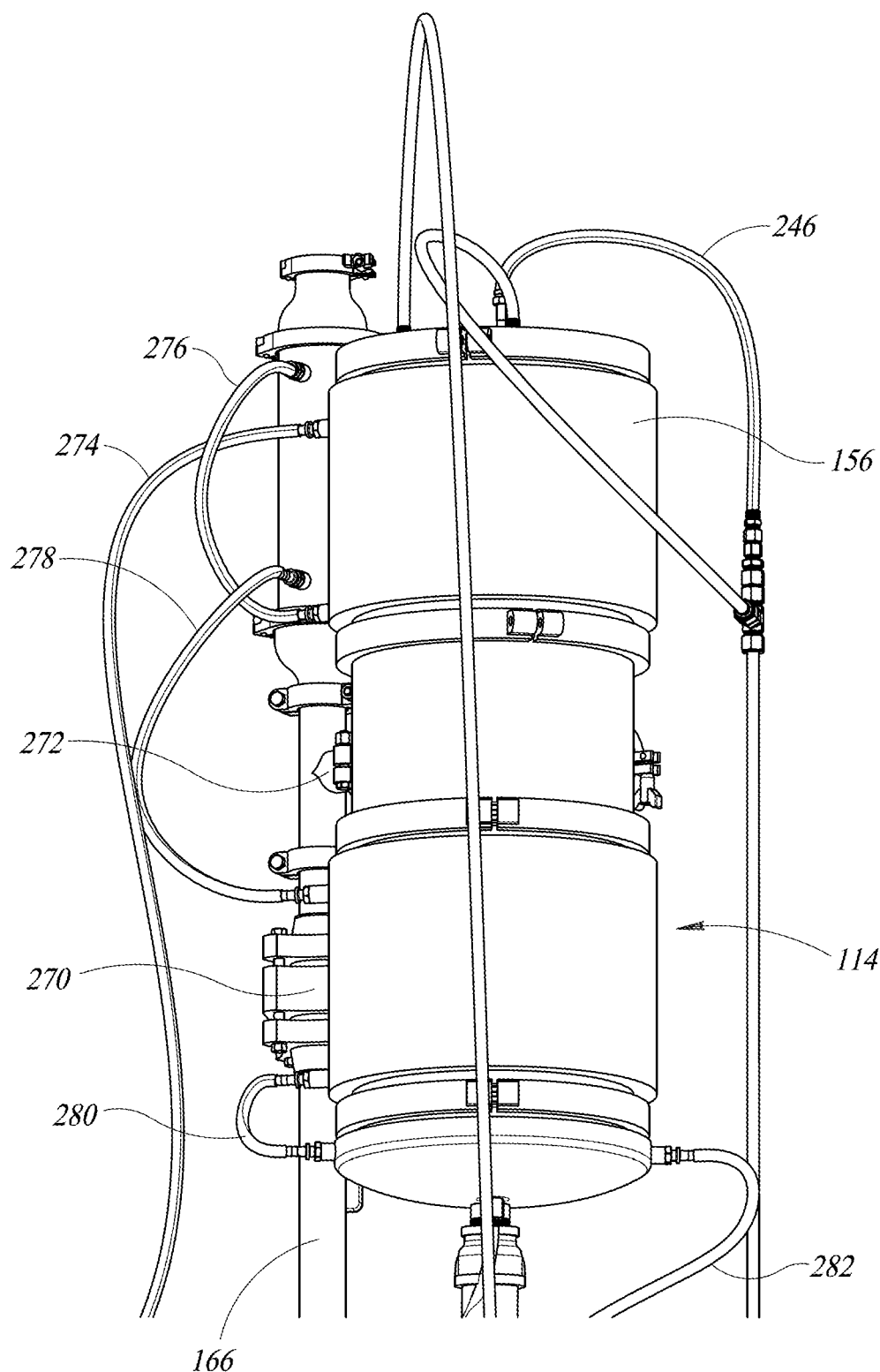
FIG. 18 illustrates a rear, bottom, and left-side perspective view of the evaporator of FIG. 17.

FIGS. 17 and 18 illustrate front and rear perspective views, respectively, of the evaporator 114. As illustrated in FIGS. 17 and 18, the evaporator 114 includes a generally cylindrical outer casing or housing 156, which can be made of copper or stainless steel, and that encases or encloses other internal components. The housing 156, as well as any of the other vessels or containers described herein, can be a "tri-clamp" vessel." Further, the evaporator 114 and its housing 156 can be a double-hulled or "jacketed" vessel including an inner shell, an outer shell, an inner open space or chamber defined within the inner shell, and an outer space or chamber defined between the inner shell and the outer shell, where the outer chamber surrounds the inner chamber. In some implementations, the housing 156 includes a plurality of discrete portions thereof, such as a top end portion, a top sidewall portion, a bottom sidewall portion, and a bottom end portion thereof, each portion having its own distinct outer chamber, the plurality of portions forming a common inner chamber. Thus, the outer chamber can include a plurality of discrete, distinct, and separated chambers that are physically divided from one another, such that, for example, a coolant can flow through each of such discrete chambers separately, as described further below. In general, references throughout this disclosure to the evaporator 114 or the housing 156 that are directed to a chamber within the evaporator 114 or the housing 156, as well as generic references to a chamber within the evaporator 114 or the housing 156, are directed specifically to the inner chamber within the inner shell of the evaporator 114 and the housing 156, unless such references specifically refer to the outer chamber of the evaporator 114 and the housing 156. A diameter of the inner chamber of the evaporator 114 formed within the housing 156 can be 11½ or 12 inches.

A coolant at a relatively low temperature can be supplied to the outer chamber. In some implementations, the coolant can comprise a slurry of isopropyl alcohol and dry ice (solidified carbon dioxide), or a slurry of liquid nitrogen and acetone, such as at a temperature of −137.2 degrees Fahrenheit. In some implementations, the slurry can be continually cycled through the outer chamber. In other implementations, a predetermined amount of slurry can be provided to the outer chamber and held there. In either case, the slurry can reduce the temperature of housing 156 to below a boiling temperature of the solvent, which can be lower than 60 degrees Fahrenheit, or between 40 and 60 degrees Fahrenheit, or between 50 and 60 degrees Fahrenheit, or between 55 and 60 degrees Fahrenheit. Thus, the temperature of the housing 156 can be higher than the temperature of the winterization vessels 106. In some implementations, the slurry can reduce the temperature of housing 156 to lower than −22 degrees Fahrenheit, or between −22 and −58 degrees Fahrenheit, or between −22 and −68 degrees Fahrenheit. In some implementations, the slurry can reduce the temperature of housing 156 to lower than 40 degrees Fahrenheit.

Figure 19:
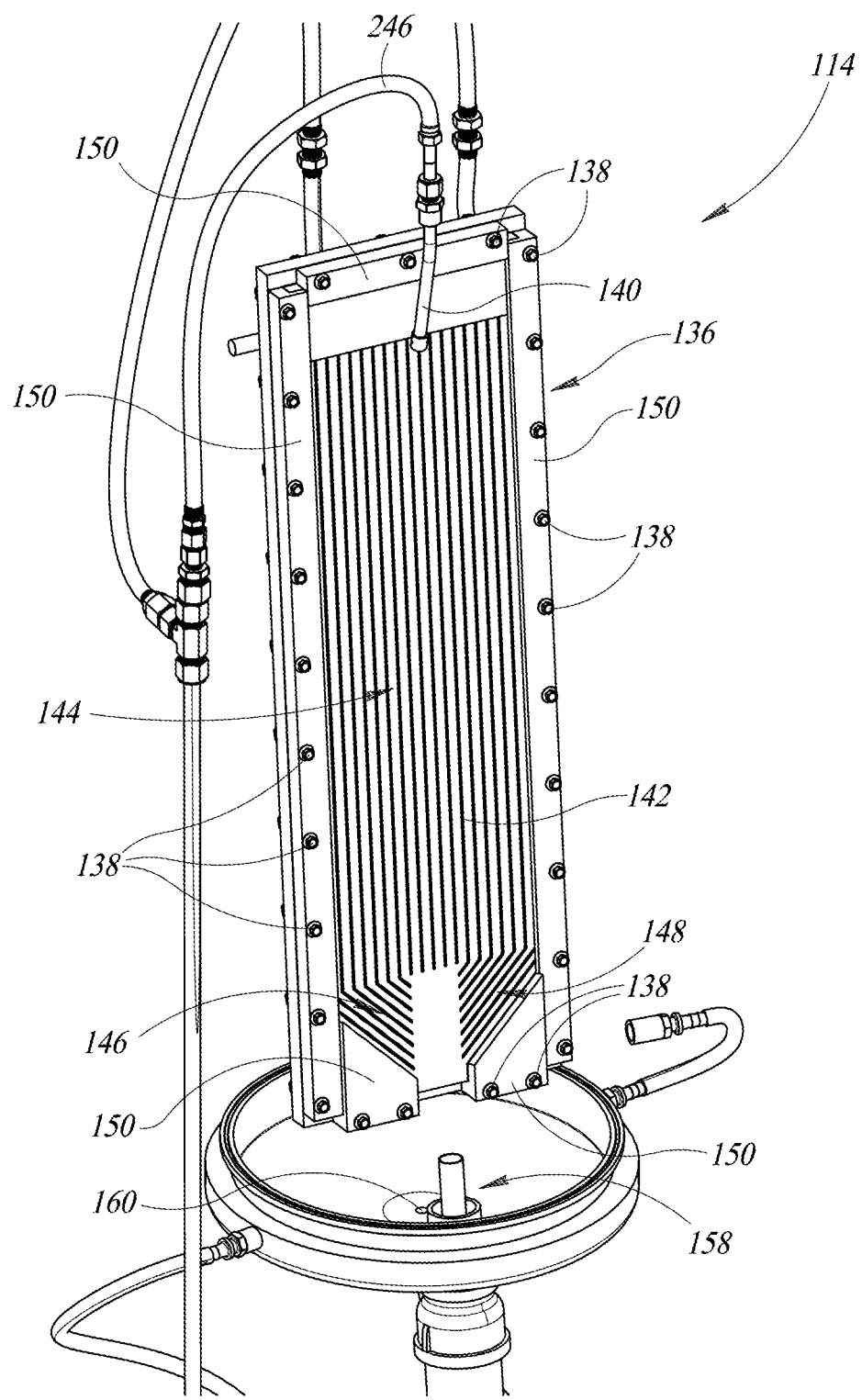
FIG. 19 illustrates a perspective view of the evaporator of FIGS. 17 and 18 with external components thereof removed to illustrate internal components including an evaporator plate assembly.

FIGS. 19-23 illustrate the evaporator 114 with external components thereof, including the outer housing 156, removed to illustrate internal components. In particular, FIG. 19 illustrates the evaporator 114 with the external housing 156 removed to illustrate an internal evaporator plate assembly 136 and a spray nozzle 140 that is configured to drip or spray the mixture onto the front surface of the evaporator plate assembly 136. As illustrated in FIG. 19, the evaporator plate assembly 136 includes a plurality of plates stacked on one another and secured to one another by a plurality of frame elements 150 and by a plurality of bolts 138 that extend through the frame elements 150 and through the thickness of the stack of the plates. In some implementations, the frame elements 150 are made of copper or stainless steel.

As illustrated in FIG. 19, the evaporator plate assembly 136 also includes a front evaporator plate 142, which can be made of copper or stainless steel, and onto which the nozzle 140 can spray the mixture. The front evaporator plate 142 can have overall dimensions of 8 inches or 12 inches wide and 24 inches long. The front evaporator plate 142 includes a first plurality of parallel ridges and corresponding parallel striations or grooves or channels 144 that extend along the length of the plate 142 from proximate top end portion of the plate 142 to a bottom end portion of the plate 142. In some cases, the channels 144 extend to the very top of the plate 142, while in other implementations, the channels 144 extend shy of the very top of the plate 142, leaving planar or flat a landing area for the mixture to be sprayed onto.

The channels 144 can increase the uniformity of the flow of the mixture down the front face of the plate 142. Each of the channels 144 spans the same distance, with their respective top ends at the same elevation as one another and their respective bottom ends at the same elevation as one another. The bottom end portion of the plate 142 also includes a second plurality of parallel grooves or channels 146 that extend diagonally and obliquely from bottom ends of a left-side portion of the channels 144 further downward toward the bottom end of the plate 142 and rightward or inward toward a center of the plate 142. The bottom end portion of the plate 142 also includes a third plurality of parallel grooves or channels 148 that extend diagonally and obliquely from bottom ends of a right-side portion of the channels 144 further downward toward the bottom end of the plate 142 and leftward or inward toward the center of the plate 142.

In some implementations, a depth of each of the channels 144, the channels 146, and the channels 148 is less than or equal to ⅛ of an inch, or 1/32 of an inch, which is shallow enough to allow the mixture to flow over the ridges between the channels to increase the uniformity of the flow down the front face of the plate 142. In some implementations, the channels 144 are spaced apart from one another by ⅝ of an inch center-to-center. The channels 144, 146, and 148 encourage the mixture of the essential oils and the solvent to flow in thin layers down the front, outer face of the plate 142.

In some implementations, instead of or in addition to the channels 144, 146, and 148, the plate 142 can include a plurality of raised protrusions or ridges and/or a plurality recessed depressions, or other three-dimensional features configured to increase the evaporation of the solvent from the face of the plate 142. Such protrusions or depressions can have respective overall individual shapes including triangular, diamond, or undulating or wave shapes, with long axes of the triangular, diamond, or undulating or wave shapes aligned with the length of the plate 142. Such protrusions or depressions can increase the overall surface area of the plate 142 and can agitate the mixture as it flows down the face of the plate 142. The increased surface area and agitation can in turn increase the rate at which the solvent evaporates from the face of the plate 142.

The bottom end portion of the plate 142 does not include any grooves or channels directly below bottom ends of a center portion of the channels 144 located between the left side portion of the channels 144 and the right side portion of the channels 144. Thus, a flat portion of the plate 142 exists below the center portion of the channels 144 and at the center of the plate 142 between the second plurality of channels 146 and the third plurality of channels 148. This flat portion of the plate 142 can resemble, and to some degree function, as a funnel, to funnel the mixture toward the center of the plate 142 as it approaches the bottom end of the plate 142.

As illustrated in FIG. 19, the frame elements 150 include a top frame element 150 that extends along a top end of the evaporator plate assembly 136, a left side frame element 150 that extends along the left side of the evaporator plate assembly 136, a right side frame element 150 that extends along the right side of the evaporator plate assembly 136, a left side bottom frame element 150 that extends along the left side of the bottom of the evaporator plate assembly 136, underneath the second plurality of channels 146, and a right side bottom frame element 150 that extends along the right side of the bottom of the evaporator plate assembly 136, underneath the third plurality of channels 148. The frame elements 150 can create a raised ridge that extends along the edges of the plate 142 above a front surface of the plate 142 by at least ¹⁄₁₆ of an inch, to prevent the mixture running off the edges of the plate 142.

Figure 20:
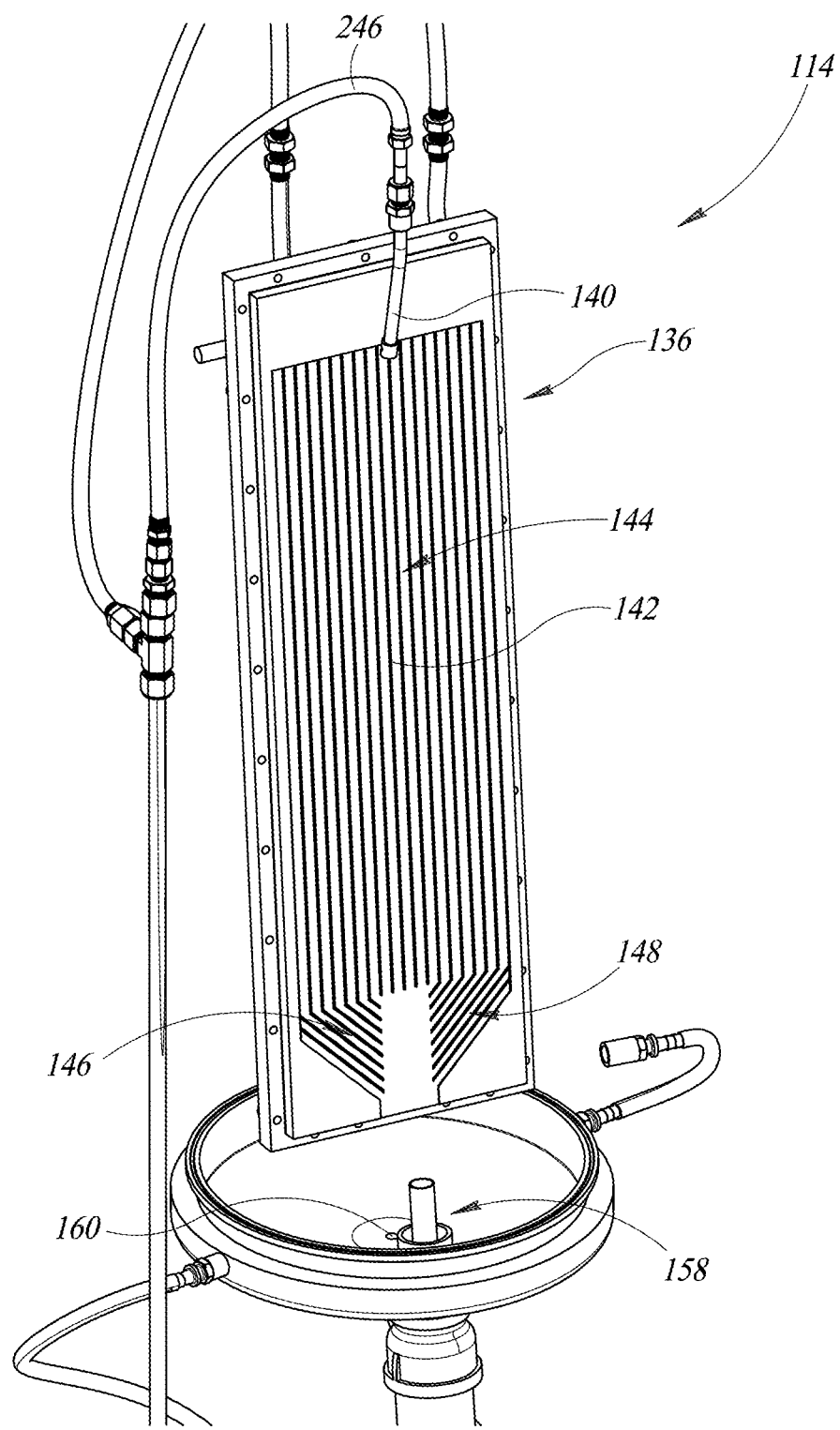
FIG. 20 illustrates a perspective view of the evaporator of FIGS. 17-19 with components of the evaporator plate assembly removed to illustrate internal components of the evaporator plate assembly.
Figure 21:
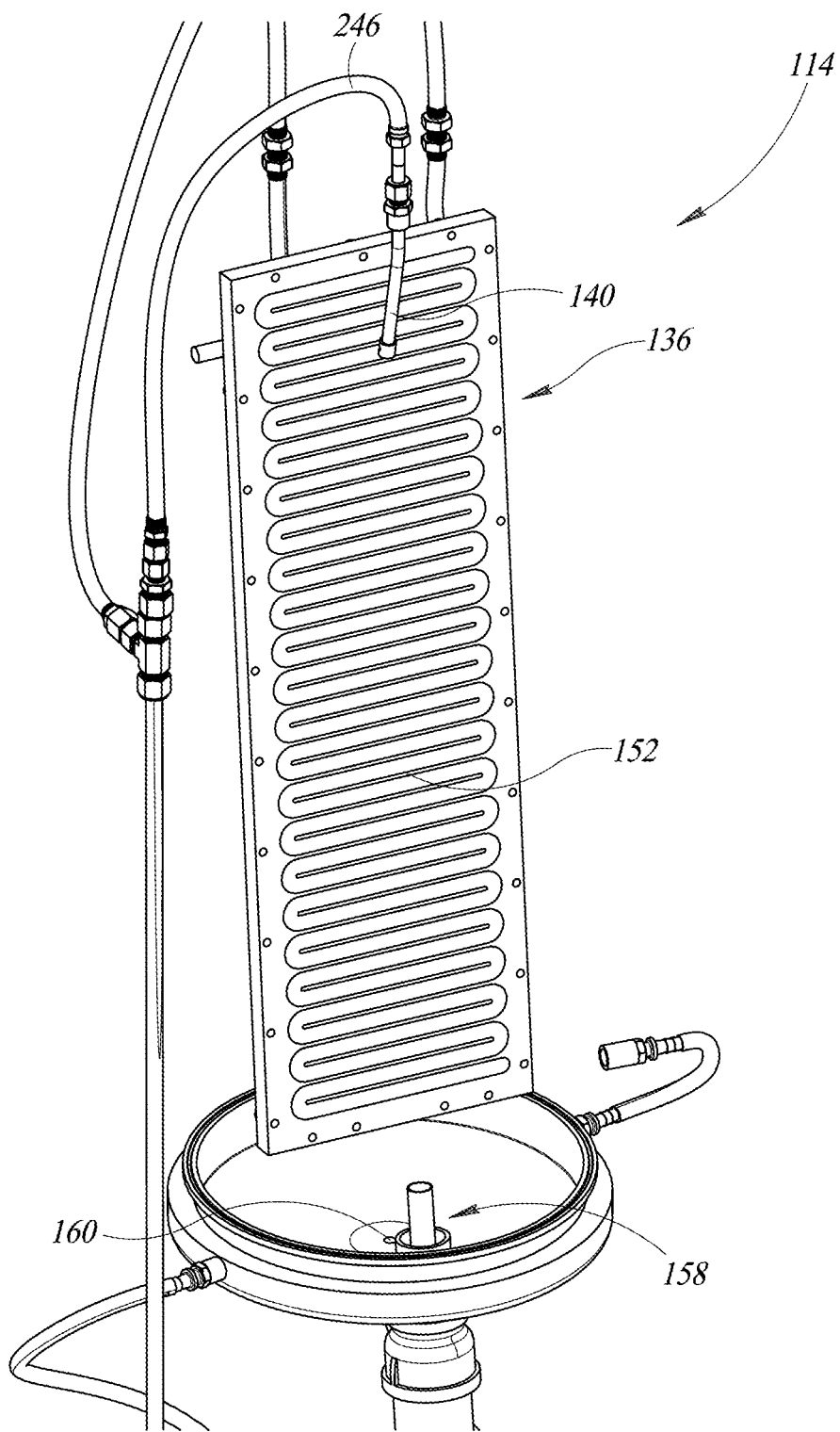
FIG. 21 illustrates a perspective view of the evaporator of FIGS. 17-20 with additional components of the evaporator plate assembly removed to illustrate additional internal components of the evaporator plate assembly.
Figure 22:
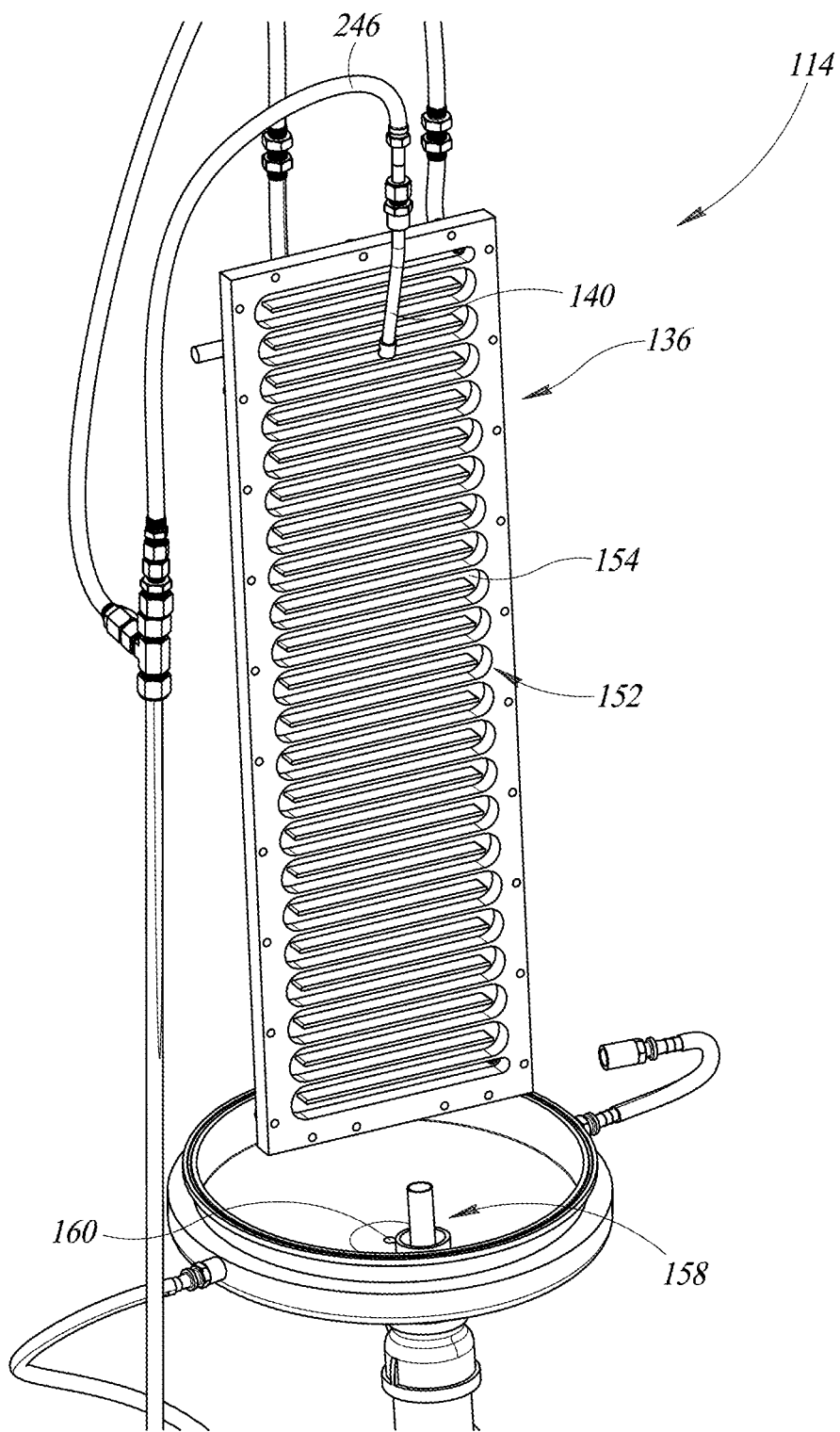
FIG. 22 illustrates a perspective view of the evaporator of FIGS. 17-21 with additional components of the evaporator plate assembly removed to illustrate additional internal components of the evaporator plate assembly.

FIG. 20 illustrates the evaporator 114 with the external housing 156, the bolts 138, and the frame elements 150 removed. FIG. 21 illustrates the evaporator 114 with the external housing 156, the bolts 138, the frame elements 150, and the front evaporator plate 142 removed to illustrate a heat exchanger 152 located behind the front evaporator plate 142. In some implementations, the heat exchanger 152 is made of copper or stainless steel. FIG. 22 illustrates the evaporator 114 with the external housing 156, the bolts 138, the frame elements 150, the front evaporator plate 142, and a cover plate of the heat exchanger 152 removed to illustrate internal components of the heat exchanger 152 located behind its cover plate. In particular, as illustrated in FIG. 22, the heat exchanger 152 includes a serpentine groove 154 that extends from an inlet at a top, right-hand corner of the heat exchanger 152, back and forth between the left and right sides of the heat exchanger 152, downward toward the bottom end of the heat exchanger 152 where the groove 154 terminates at an outlet at a bottom, right-hand corner of the heat exchanger 152. In some implementations, the inlet and the outlet can be reversed so that the inlet is at the bottom right-hand corner, and the outlet is at the top right-hand corner, of the heat exchanger 152.

Figure 23:
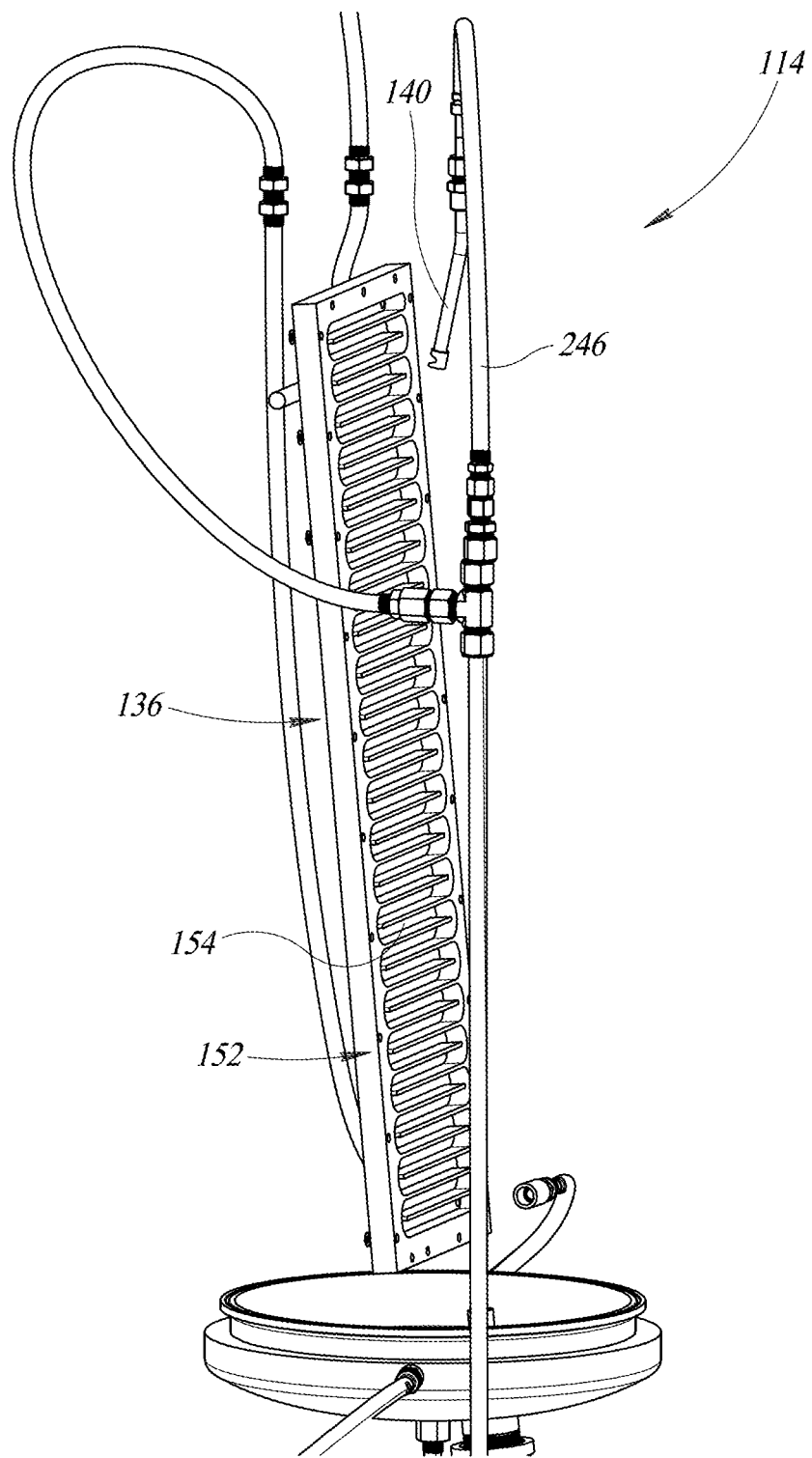
FIG. 23 illustrates a different perspective view of the evaporator shown in FIG. 22 to illustrate an orientation of the evaporator plate assembly.

FIG. 23 illustrates the evaporator 114 as shown in FIG. 22, but at a perspective that illustrates an orientation of the evaporator plate assembly 136 and that the evaporator plate assembly 136 is oriented to extend backward as it extends upward, such that it leans back slightly within the evaporator 114. In some implementations, the evaporator plate assembly 136 is 8 inches wide, is 24 inches long, and is oriented at 14.5 degrees from vertical, such that its height in a vertical direction is about 23.2 inches, and a dimensions thereof extending from its bottom end to its top end when viewed from directly above is about 6 inches. Such dimensions provide the plate assembly 136 with a surrounding buffer of about an inch between edges of the plate assembly 136 and internal surfaces of the housing 156. This buffer can be useful for fitting conduits carrying heat exchange medium through the inner chamber of the evaporator 114.

In operation, a vacuum can be drawn within the outer housing 156 of the evaporator 114, as described further below. In some implementations, drawing a vacuum within the outer housing 156 can include drawing the pressure therein down to within a range of 25-70 Torr, or within a range or 30-70 Torr, or within a range of 37.5-112.5 Torr, or within a range of 15-35 Torr, or to below 120 Torr, or to below 500 Torr, or to below 45 Torr, or to 40 Torr, or to 20 Torr. In some implementations, the pressure within the outer housing 156 can be maintained at above 20 Torr. The vacuum can reduce the temperature required to vaporize or boil components of the mixture, such as the solvent. In some implementations, as an example, the vacuum drawn within the outer housing 156 can reduce the boiling temperature of ethanol to 60 degrees Fahrenheit, which is below a temperature that would be likely to damage or "activate" the essential oils to be separated from the mixture.

A heated heat exchange medium can be supplied to the inlet of the heat exchanger 152, can flow through the serpentine groove 154 from the inlet toward the outlet, and can be removed from the outlet of the heat exchanger 152. In some implementations, the heat exchange medium can be a non-flammable, food grade heat exchange fluid such as the commercially available Dynalene HC-50. In some implementations, the heat exchange fluid can be provided at a temperature between 95 and 110 degrees Fahrenheit, or at 105 degrees Fahrenheit. The heat of the heat exchange medium can be transferred from the heat exchanger 152 to the front evaporator plate 142, such as to heat the plate 142 to at least a temperature required to vaporize components of the mixture, such as the solvent. In some implementations, for example, the front evaporator plate 142 can be heated to at least 60 degrees Fahrenheit, or to between 60 and 80 degrees Fahrenheit, or to between 60 and 70 degrees Fahrenheit, or to between 60 and 65 degrees Fahrenheit. In other implementations, the front evaporator plate 142 can be heated to at least 86 degrees Fahrenheit, or to between 86 and 104 degrees Fahrenheit, or to between 86 and 122 degrees Fahrenheit, or to between 70 and 120 degrees Fahrenheit. In some implementations, the front evaporator plate 142 can be heated to less than 120 degrees Fahrenheit, or to less than 125 degrees Fahrenheit. In some implementations, the front evaporator plate 142 can be heated to 105 degrees Fahrenheit, to 110 degrees Fahrenheit, or to 120 degrees Fahrenheit.

The de-waxed mixture stored in the reservoir within the holding tank 112 can be supplied from the holding tank 112 to the evaporator 114, and specifically to the spray nozzle 140 of the evaporator 114. The spray nozzle 140 can spray the mixture across the front of the front evaporator plate 142, such as at a rate of 60 mL per minute or between 60 and 100 mL per minute, or at a rate of 200 mL per minute or of 3.5 mL per second. At such rates, it can take about 45 minutes to spray a quantity of the mixture representative of a single full cycle of one of the winterization vessels 106 onto the plate 142. Because the evaporator plate assembly 136 is oriented generally vertically and leans backward only slightly, the mixture runs down the front of the front evaporator plate 142, such as through the first plurality of channels 144 to the second and third pluralities of channels 146 and 148, and to the flat portion of the plate 142. As the mixture runs down the front evaporator plate 142, the mixture is heated until the solvent portion or component of the mixture is boiled or evaporated off, leaving behind only the essential oils of the original or initial crude oil, such that the essential oils are distilled on the plate 142.

The degree to which the evaporator plate assembly 136 leans backward, and the length of the evaporator plate assembly 136, can be configured to ensure that by the time the mixture runs all the way to the bottom of the front evaporator plate, the entirety of the solvent within the mixture has been boiled or evaporated out of the mixture. For example, the degree to which a relatively long or tall evaporator plate assembly leans backward is less than the degree to which a relatively short evaporator plate assembly leans backward. The separated essential oils can continue to run down the front evaporator plate 142 until they reach a bottom end of the plate 142, at which point they can drip off of the plate 142 and into a first collecting conduit or pipe 158 that passes through a bottom end wall of the evaporator 114. As illustrated in FIGS. 19-22, the first collecting pipe 158 can include two concentric pipes, with an inner one of the concentric pipes collecting the separated essential oils as described above, and a second one of the concentric pipes coupled to the housing 156. The inner concentric pipe can be coupled to the outer concentric pipe at a location outside of and below the housing 156, such that the inner concentric pipe is coupled to the housing 156 only by the outer concentric pipe, and such that an annular space between the inner and outer concentric pipes separates the warm essential oils from the low temperature of the housing 156.

Because the housing 156 of the evaporator 114 remains below the boiling temperature of the solvent, the inner surface of the housing 156, including inner surfaces of top, bottom, and sidewalls thereof, can function as a condenser or a condensing surface onto which the evaporated solvent can be condensed. In some implementations, the inner surfaces of the top, bottom, and/or sidewalls of the housing 156 can include parallel ridges and corresponding parallel striations or grooves or channels, or protrusions or depressions as described above, to increase the condensation of the solvent onto such surfaces. In some implementations, the housing 156 of the evaporator 114 is chilled, such as by a coolant at a relatively low temperature, to assist in condensing the solvent in this manner. Thus, the solvent can condense on the inner surfaces of the walls of the housing 156, run down such surfaces, and collect in liquid form at the bottom of the evaporator, where it can flow through a drain 160 at the lowest elevation portion of the inner surfaces of the walls of the housing 156 and into a second collecting conduit or pipe 162 that collects the condensed solvent and carries it away from the evaporator 114. In some implementations, the solvent evaporates and condenses as described herein at respective rates sufficient to maintain the pressure within the evaporator 114 at a desired level.

Figure 24:
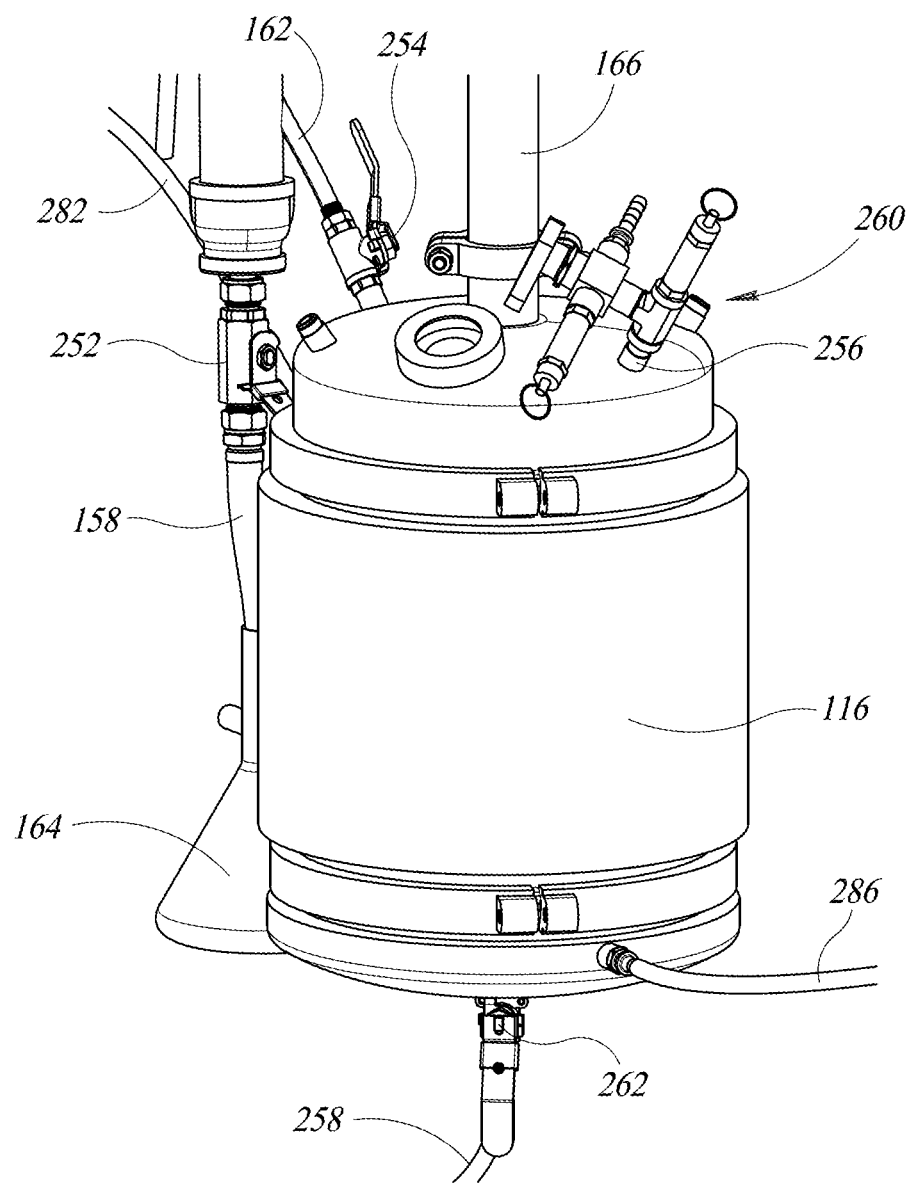
FIG. 24 illustrates a front, top, and right-side perspective view of a pair of reservoirs of the system of FIGS. 1-4.
Figure 25:
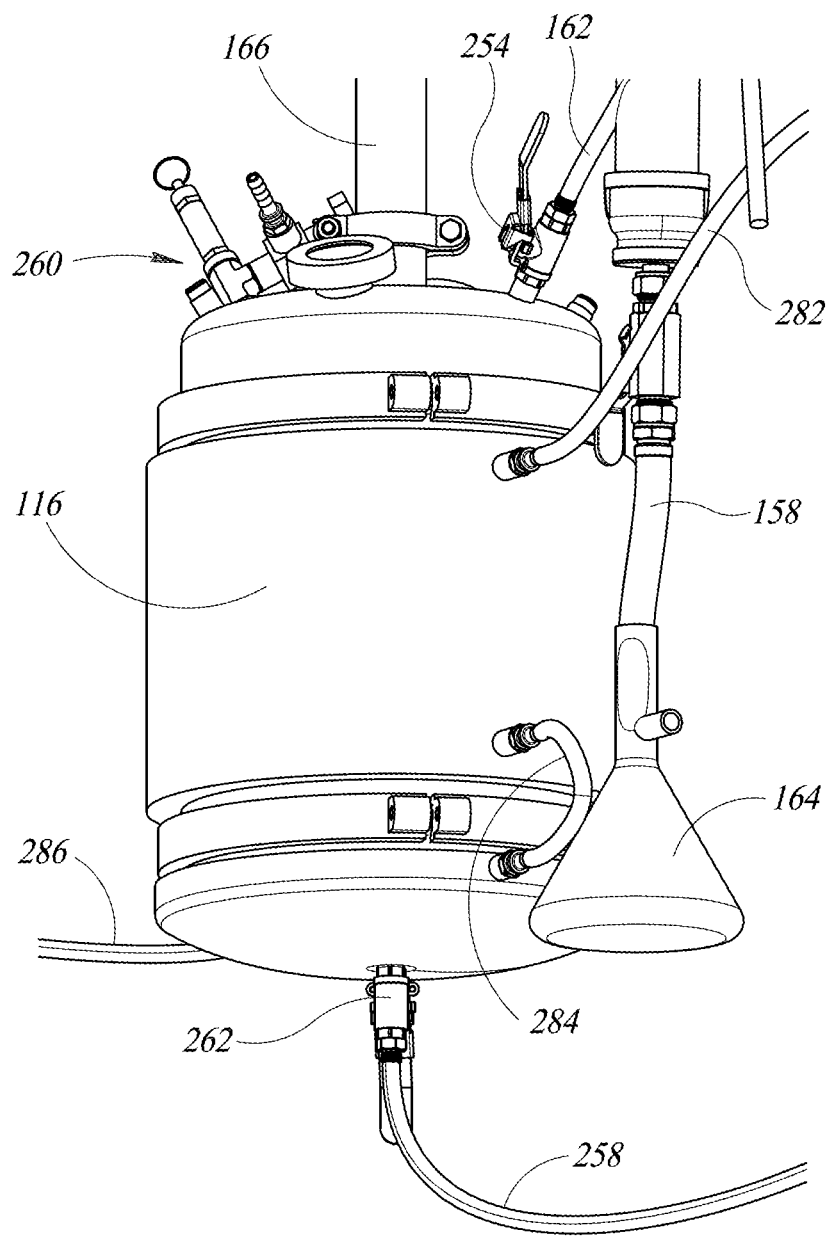
FIG. 25 illustrates a rear, bottom, and left-side perspective view of the pair of reservoirs of FIG. 24.

FIGS. 24 and 25 illustrate front and rear perspective views, respectively, of the solvent reservoir 116 and an essential oil reservoir 164. The solvent reservoir 116 can be a double-hulled or "jacketed" vessel including an inner shell, an outer shell, an inner open space or chamber defined within the inner shell, and an outer space or chamber defined between the inner shell and the outer shell, where the outer chamber surrounds the inner chamber. In some implementations, a housing of the solvent reservoir 116 includes a plurality of discrete portions thereof, such as a top end portion, a sidewall portion, and a bottom end portion thereof, each portion having its own distinct outer chamber, the plurality of portions forming a common inner chamber. Thus, the outer chamber can include a plurality of discrete, distinct, and separated chambers that are physically divided from one another, such that, for example, a coolant can flow through each of such discrete chambers separately, as described further below. In general, references throughout this disclosure to the solvent reservoir 116 that are directed to a chamber within the solvent reservoir 116, as well as generic references to a chamber within the solvent reservoir 116, are directed specifically to the inner chamber within the inner shell of the solvent reservoir 116, unless such references specifically refer to the outer chamber of the solvent reservoir 116.

A coolant at a relatively low temperature can be supplied to the outer chamber. In some implementations, the coolant can comprise a slurry of isopropyl alcohol and dry ice (solidified carbon dioxide), or a slurry of liquid nitrogen and acetone, such as at a temperature of −137.2 degrees Fahrenheit. In some implementations, the slurry can be continually cycled through the outer chamber. In other implementations, a predetermined amount of slurry can be provided to the outer chamber and held there. In either case, the slurry can reduce the temperature of solvent reservoir 116 to a temperature below a boiling temperature of the solvent, which can be lower than 60 degrees Fahrenheit, or between 40 and 60 degrees Fahrenheit, or between 50 and 60 degrees Fahrenheit, or between 55 and 60 degrees Fahrenheit. Thus, the temperature of the solvent reservoir 116 can be higher than the temperature of the winterization vessels 106. In some implementations, the coolant or the slurry used to cool the winterization vessels 106 can be the same as the coolant or the slurry used to cool both the evaporator 114 and the solvent reservoir 116. Such a common coolant or slurry can also be cooled or chilled by, and supplied from, a common chiller system. In some implementations, the common chiller system can be powered by a two-stage piston compressor. In some implementations, the common chiller system can be a part of a centralized refrigeration unit that also heats the heat exchange medium that flows through the heat exchanger 152. In some implementations, the waste heat generated by the common chiller system can be used to at least in part heat the heat exchange medium.

As illustrated in FIGS. 24 and 25, the first collecting pipe 158 can supply the separated, concentrated, and purified essential oils from the evaporator 114 to the essential oil reservoir 164. The separated, concentrated, and purified essential oils can then be removed or withdrawn or harvested from the essential oil reservoir 164 at a desired time, such as when a predetermined number of processing cycles have been completed or when a predetermined amount of the essential oils have been collected. In some cases, the essential oils can then be supplied to a reboiler that maintains the essential oils at a temperature within a range extending from 80 degrees Fahrenheit to 95 degrees Fahrenheit. Thus, the reboiler can continue to boil off any solvent remaining in the essential oils without damaging the essential oils.

As also illustrated in FIGS. 24 and 25, the second collecting pipe 162 can supply the separated solvent in liquid form from the evaporator 114 to the solvent reservoir 116. In some implementations, the solvent reservoir 116 can be chilled or cooled to assist in maintaining the solvent in liquid form therein. The first and second collecting pipes 158, 162 fluidically couple the interior of the evaporator 114 to the interior of the essential oil reservoir 164 and to the interior of the solvent reservoir 116. Thus, the gas pressures within the interiors of each of these components are at equilibrium, such that a vacuum drawn in one of them is drawn in all of them. In some cases, however, the second collecting pipe 162 can include a p-trap, so that the interior of the evaporator 114 is separated from the interior of the solvent reservoir 116, and so that vapors from the solvent reservoir 116 are prevented from re-entering the interior of the evaporator 114.

As also illustrated in FIGS. 24 and 25, a vacuum-drawing pipe 166 is physically and fluidically coupled to a top end of the solvent reservoir 116. As illustrated in FIGS. 1-4, a top end portion of the vacuum-drawing pipe 166 includes a condenser 168, of a type referred to as a "shotgun condenser." The condenser 168 is chilled and condenses any evaporated or gaseous solvent passing therethrough. Thus, a vacuum can be applied to a top end of the pipe 166 to draw a vacuum inside the evaporator 114, the solvent reservoir 116, and the essential oil reservoir 164, without allowing gaseous solvent to escape out of the top end of the pipe 166 and travel to the source of the vacuum. In some implementations, seals of the vessels within which the vacuum is drawn can include knife-edge type seals with Teflon or copper vacuum sealing components.

Figure 26:
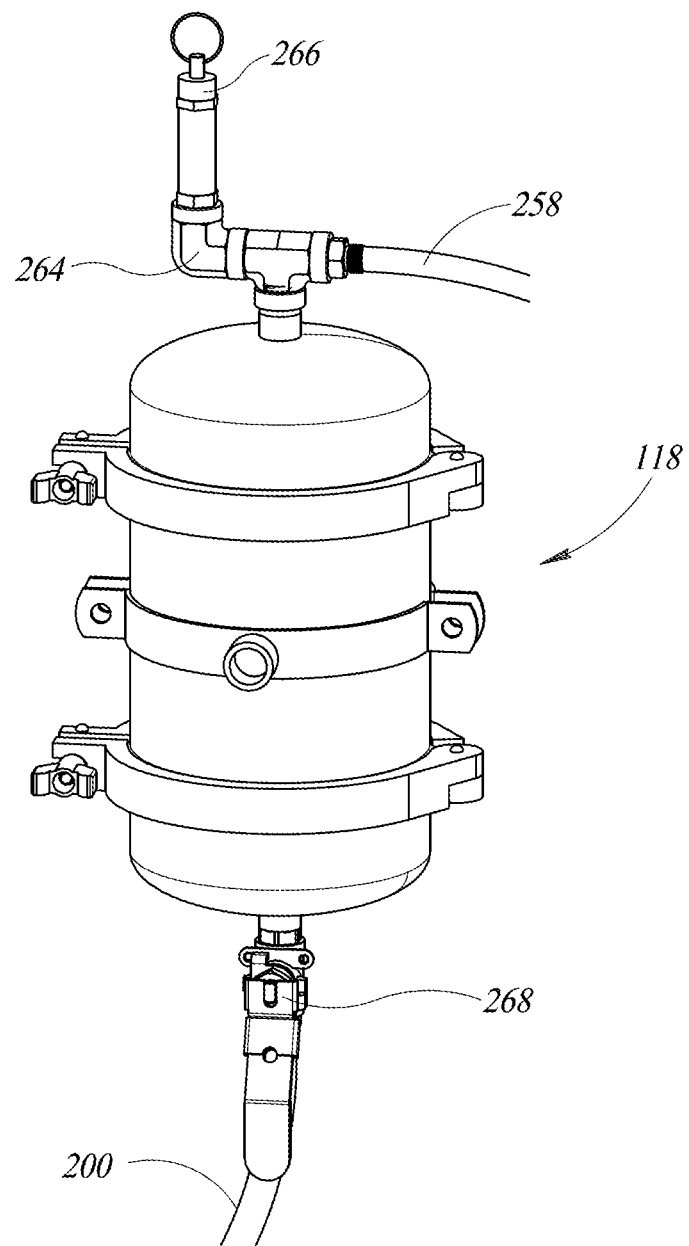
FIG. 26 illustrates a front, top, and right-side perspective view of a filtering vessel of the system of FIGS. 1-4.
Figure 27:
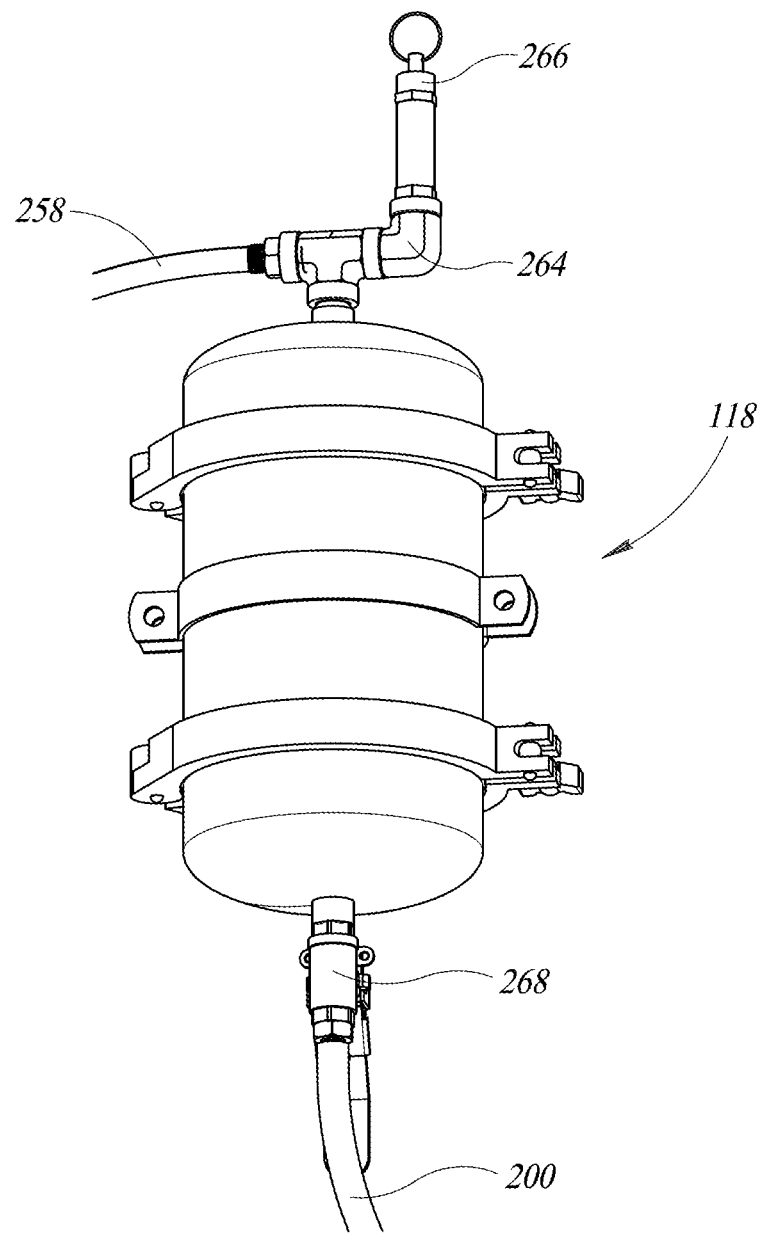
FIG. 27 illustrates a rear, bottom, and left-side perspective view of the filtering vessel of FIG. 26.

FIGS. 26 and 27 illustrate front and rear perspective views, respectively, of the filtering vessel 118. As illustrated in FIGS. 26 and 27, condensed or liquefied solvent can be supplied from the solvent reservoir 116 in liquid form to the filtering vessel 118 for filtering therein. The filtering vessel 118 includes a desiccant-based filter to remove any residual water from the solvent, as well as a charcoal and/or clay-based filter to remove other contaminants from the solvent. The filtering vessel 118 can also include a 3-angstrom and/or a 1-angstrom molecular sieve to remove water. Once filtered through the filtering vessel 118, the condensed or liquefied solvent can be supplied from the filtering vessel 118 to a reservoir of the solvent, from which it can then be withdrawn and supplied back to the initial mixing tank 104 to begin the processing of a new batch of crude oil. Thus, the solvent can be recycled and reused repeatedly.

FIGS. 1-27 also illustrate that the system 100 includes a variety of conduits 120 that can be used to supply materials, mixtures, solutions, and compounds from one component of the system 100 to another. For example, FIGS. 5 and 6 illustrate that the initial mixing tank 104 is coupled to three different conduits, including an inlet conduit 200 for supplying solvent into the mixing tank 104, such as from the filtering vessel 118, a gas pressure regulation conduit 202 for regulating the pressure of a gas within the mixing tank 104, and an outlet conduit 204 for supplying a mixture from the mixing tank 104 to the winterization vessels 106.

As illustrated in FIGS. 5 and 6, the pressure regulation conduit 202 is coupled at a first end thereof to the mixing tank 104 and at a second end thereof opposite to the first end to a gas pressure regulation system 206. The gas pressure regulation system 206 includes a safety valve or release valve 208 that can release gas from the system 206 and thereby from the tank 104 to prevent the accumulation of dangerous pressure levels within the tank 104. In some implementations, the release valve 208 can release pressures at, and prevent the accumulation of pressures above, 150 psi. The gas pressure regulation system 206 also includes a three-way valve 210 that can alternatively couple the conduit 202, and thus the tank 104, to atmosphere (at about 15 psi) through an outlet 212, to a coupling 214 for an inert gas such as nitrogen gas ($N_2$), or to a closed position. As also illustrated in FIGS. 5 and 6, the outlet conduit 204 includes a valve 216 at its connection to the tank 104, so that an operator can control the flow of the mixture from the mixing tank 104 into the conduit 204.

In operation, an operator of the system 100 can close the valve 216 to ensure that materials within the tank 104 are held within the tank 104 and cannot leave the tank 104 through the outlet conduit 204, and turn the valve 210 so that the tank 104 is coupled through the pressure regulation conduit 202 to atmospheric pressure. The operator can then supply the plant material or the crude oil to the tank 104, as described above, and can supply the solvent, such as ethanol, to the tank 104, such as through the inlet conduit 200. Gasses within the tank 104, such as air, can be vented to atmosphere through the conduit 202, for example, as the solvent is supplied into the tank 104. Once the plant material or the crude oil and the solvent have been supplied to the tank 104, the valve 210 can be turned to the closed position and the mixing tank 104 can be operated to mix the materials therein.

Once the mixing is completed, the operator can couple a source of a pressurized inert gas, such as nitrogen gas, to the coupling 214, open the valve 216 to allow materials within the tank 104 to leave the tank 104 through the outlet conduit 204, close a valve 268 within the conduit 200 (as described further below) to prevent backflow through the conduit 200, and turn the valve 210 so that the tank 104 is coupled through the pressure regulation conduit 202 to the source of the pressurized gas. The pressurized gas can then force the mixture to flow out of the tank 104 through the outlet conduit 204. The mixture then flows through the conduit 204 toward a first joint 218a that splits the flow between two distinct conduits, one of which directs the flow toward a second joint 218b that further splits the flow between two distinct conduits, thus creating three distinct flow paths for the mixture. Each of those flow paths can be regulated by an operator through the use of a respective flow control valve 220, and can direct the flow of the mixture toward a respective one of the winterization vessels 106.

FIGS. 7 and 8 illustrate that each of the winterization vessels 106 is coupled to three different conduits, including an inlet conduit 222 for supplying the mixture into the respective winterization vessel 106, such as from a respective one of the valves 220, a gas pressure regulation conduit 224 for regulating the pressure of a gas within the winterization vessel 106, and an outlet conduit 226 for supplying a winterized mixture from the winterization vessel 106 to a respective filtering vessel 108.

As illustrated in FIGS. 7 and 8, each of the pressure regulation conduits 224 is coupled at a first end thereof to the respective winterization vessel 106 and at a second end thereof opposite to the first end to a gas pressure regulation system 230. The gas pressure regulation system 230 includes the same features as the system 206 and operates in the same manner as the system 206 but with respect to the respective winterization vessel 106 rather than the mixing tank 104. As also illustrated in FIGS. 7 and 8, the outlet conduit 226 includes a valve 228, so that an operator can control the flow of the mixture from the respective winterization vessel 106 to a respective filtering vessel 108.

In operation, an operator of the system 100 can close the valves 228 to ensure that materials within the winterization vessels 106 are held within the winterization vessels 106 and cannot leave the tank winterization vessels 106 through the outlet conduits 226, and operate the gas pressure regulation systems 230 so that the winterization vessels 106 are coupled through the systems 230 to atmospheric pressure. The operator can then open the valves 220 to supply the mixture from the mixing tank 104 to the winterization vessels 106. Gasses within the winterization vessels 106, such as air, can be vented to atmosphere through the systems 230 as the mixture is supplied into the winterization vessels 106. Once the mixture has been supplied to one of the winterization vessels 106, the system 230 can be operated so that the inner chamber of the winterization vessel 106 is closed, and the winterization vessels 106 can be operated to winterize the mixture therein.

Once the winterization is completed, the operator can close the valves 220 to prevent backflow through the conduits 222, couple a source of a pressurized inert gas, such as nitrogen gas, to the systems 230, open the valves 228 to allow the winterized mixture to leave the winterization vessels 106 through the outlet conduits 226, and operate the systems 230 so that the winterization vessels 106 are coupled through the systems 230 to the source of the pressurized gas. The pressurized gas can then force the mixture to flow out of the winterization vessels 106 through the outlet conduit 226. The flow path through the conduit 226 can be regulated by an operator through the use of the respective flow control valve 228, and can direct the flow of the mixture toward a respective one of the filtering vessels 108.

In some implementations, once the mixture is forced out of the winterization vessels 106 in this manner, leaving the solidified waxes behind, additional solvent such as ethanol can be injected into the winterization vessels 106, such as through a venturi device, to extract remaining essential oils held in the solidified waxes. For example, a stream of nitrogen can be supplied into the winterization vessels 106 through a venturi device, and the solvent can be injected into the venturi device and taken up by the stream of nitrogen in accordance with the venturi effect. Such an implementation can allow additional essential oils to be extracted from the solidified waxes.

FIGS. 7 and 8 illustrate that each of the filtering vessels 108 is coupled to two different conduits, including an inlet conduit 232 for supplying the mixture into the filtering vessel 108, such as from the respective winterization vessel 106, and an outlet conduit 234 for supplying a mixture from the filtering vessel 108 to the fine filtering vessel 110. In operation, the operator can open the valves 228 to supply the mixture from the winterization vessels 106 to the respective filtering vessels 108. As the mixture is supplied to the filtering vessels 108, the mixture is filtered therein, as described above. The pressurized gas supplied to the winterization vessels 106 can continue to force the mixture to flow through the filters within the filtering vessels 108 and out of the filtering vessels 108 through the respective outlet conduits 234 toward a first joint 236a (see FIGS. 13 and 14) that joins two of the outlet conduits into a single conduit, which directs the flow toward a second joint 236b (see FIGS. 13 and 14) that further joins the flow between the single conduit and the third of the outlet conduits 234, thus creating a single flow path for the mixture through a conduit 240 that directs the flow of the mixture toward the fine filtering vessel 110. An end of each of the conduits 234 coupled to a respective one of the joints 236a and 236b can be regulated by an operator through the use of a respective flow control valve 238.

FIGS. 13 and 14 illustrate that the fine filtering vessel 110 is coupled to two different conduits, including the inlet conduit 240 for supplying the mixture into the fine filtering vessel 110, such as from the filtering vessels 108, and an outlet conduit 242 for supplying a mixture from the fine filtering vessel 110 to the holding tank 112. In operation, the operator can open the valves 238 to supply the mixture from the filtering vessels 108 to the fine filtering vessel 110. As the mixture is supplied to the fine filtering vessel 110, the mixture is filtered therein, as described above. The pressurized gas supplied to the winterization vessels 106 can continue to force the mixture to flow through the filters within the fine filtering vessel 110 and out of the filtering vessel 110 through the outlet conduit 242 toward the holding tank 112.

FIGS. 15 and 16 illustrate that the holding tank 112 is coupled to three different conduits, including the outlet conduit 242 (which may be referred to herein as an inlet conduit when discussed with reference to the holding tank 112 rather than the fine filtering vessel 110) for supplying the filtered mixture into the holding tank 112, such as from the fine filtering vessel 110, a gas pressure regulation conduit 244 for regulating the pressure of a gas within the holding tank 112, and an outlet conduit 246 for supplying a mixture from the holding tank 112 to the evaporator 114.

As illustrated in FIGS. 15 and 16, the pressure regulation conduit 244 is coupled at a first end thereof to the holding tank 112 and at a second end thereof opposite to the first end to a gas pressure regulation system 248. The gas pressure regulation system 248 includes the same features as the system 206 and operates in the same manner as the system 206 but with respect to the holding tank 112 rather than the mixing tank 104. As also illustrated in FIGS. 15 and 16, the outlet conduit 246 includes a valve 250, which can be a needle valve and can provide fine control over a flow rate into the conduit 246 and toward the evaporator 114, at its connection to the holding tank 112, so that an operator can control the flow of the mixture from the holding tank 112 into the conduit 246.

In operation, an operator of the system 100 can close the valve 250 to ensure that materials within the tank 112 are held within the tank 112 and cannot leave the tank 112 through the outlet conduit 246, and operate the system 248 so that the tank 112 is coupled through the pressure regulation conduit 244 to atmospheric pressure. The filtered mixture can then flow from the fine filtering vessel 110 to the tank 112 through the conduit 242. Gasses within the tank 112, such as air, can be vented to atmosphere through the conduit 244 and the system 248. Once the filtered mixture has been supplied to the tank 112, the system 248 can be operated so that an inner chamber of the tank 112 is closed, and the mixture can be stored or held within the tank 112 for later processing within the evaporator 114.

Once the evaporator 114 is ready to be supplied with the mixture from the holding tank 112, the operator can close the valves 238 to prevent backflow through the conduit 242, couple a source of a pressurized inert gas, such as nitrogen gas, to the system 248, open the valve 250 to allow materials within the tank 112 to leave the tank 112 through the outlet conduit 246, and operate the system 248 so that the tank 112 is coupled through the pressure regulation conduit 244 to the source of the pressurized gas. The pressurized gas can then force the mixture to flow out of the tank 112 through the outlet conduit 246. The mixture then flows through the conduit 246 toward the evaporator 114, so that it feeds the spray nozzle 140 within the evaporator 114.

Once the mixture is processed within the evaporator 114 and the essential oils are separated, purified, and concentrated therefrom, the essential oils flow through the first collecting pipe 158, through a valve 252 therein, and into the essential oil reservoir 164, as described above. The solvent separated from the mixture flows through the second collecting pipe 162, through a valve 254 therein, and into the solvent reservoir 116, as described above. FIGS. 24 and 25 illustrate that the solvent reservoir 116 is coupled to four different conduits, including the second collecting pipe 162, the vacuum-drawing pipe 166, a gas pressure regulation conduit 256 for regulating the pressure of a gas within the solvent reservoir 116, and an outlet conduit 258 for supplying the solvent from the solvent reservoir 116 to the filtering vessel 118.

As illustrated in FIGS. 24 and 25, the pressure regulation conduit 256 is coupled at a first end thereof to the solvent reservoir 116 and at a second end thereof opposite to the first end to a gas pressure regulation system 260. The gas pressure regulation system 260 includes the same features as the system 206 and operates in the same manner as the system 206 but with respect to the solvent reservoir 116 rather than the mixing tank 104. As also illustrated in FIGS. 24 and 25, the outlet conduit 258 includes a valve 262 at its connection to the solvent reservoir 116, so that an operator can control the flow of the solvent from the solvent reservoir 116 into the conduit 258.

As illustrated in FIGS. 17 and 18, the vacuum drawing pipe 166 includes a valve 270 therein, which can be used by an operator to open or close the vacuum drawing pipe 166 and to control the flow of fluids through the pipe 166 from the solvent reservoir 116 to the condenser 168 or from the condenser 168 to the reservoir 116. As also illustrated in FIGS. 17 and 18, the vacuum drawing pipe 166 includes a joint 272 that couples the pipe to a side conduit that provides a flow path directly from the pipe 166 to the evaporator 114. The joint 272 is located between the condenser 168 and the valve 270, and the valve 270 is located between the joint 272 and the solvent reservoir 116. By closing the valve 270 within the vacuum drawing pipe 166 and the valve 254 in the second collecting pipe 162, an operator can therefore close off the solvent reservoir 116 from the vacuum being drawn through the vacuum-drawing pipe 166 within the evaporator 114 and the essential oil reservoir 164.

In operation, an operator of the system 100 can close the valve 262 to ensure that liquid solvent within the solvent reservoir 116 is held within the reservoir 116 and cannot leave the reservoir 116 through the outlet conduit 258, and operate the system 260 so that the conduit 256 is closed. Liquid solvent can then collect within the solvent reservoir 116. Gasses within the reservoir 116, such as air, can be drawn out of the reservoir 116 through the vacuum-drawing pipe 166 while the solvent collects within the reservoir 116. At a desired time, such as when a predetermined amount of the liquid solvent has collected in the reservoir 116, the operator can close the valve 270 and the valve 254 to close off the solvent reservoir 116 from the vacuum being drawn through the vacuum-drawing pipe 166.

The operator can then couple a source of a pressurized inert gas, such as nitrogen gas, to the system 260, open the valve 262 to allow the solvent in the reservoir 116 to leave the reservoir 116 through the outlet conduit 258, and operate the system 260 so that the reservoir 116 is coupled through the pressure regulation conduit 256 to the source of the pressurized gas. The pressurized gas can then force the liquid solvent to flow out of the reservoir 116 through the outlet conduit 258. The solvent then flows through the conduit 258 toward the filtering vessel 118.

FIGS. 26 and 27 illustrate that the filtering vessel 118 is coupled to three different conduits, including the outlet conduit 258 (which may be referred to herein as an inlet conduit when discussed with reference to the filtering vessel 118 rather than the reservoir 116) for supplying the liquid solvent into the filtering vessel 118, such as from the reservoir 116, a gas pressure regulation conduit 264 that is coupled to a safety valve or a release valve 266 for regulating the pressure within the filtering vessel 118, and the inlet conduit 200 (which may be referred to herein as an outlet conduit when discussed with reference to the filtering vessel 118 rather than the mixing tank 104) for supplying a filtered solvent from the filtering vessel 118 to the initial mixing tank 104. As also illustrated in FIGS. 26 and 27, the outlet conduit 200 includes a valve 268 at its connection to the filtering vessel 118, so that an operator can control the flow of the filtered solvent from the filtering vessel 118 into the conduit 200.

In operation, the operator can open the valve 262 to supply the liquid solvent from the solvent reservoir 116 to the filtering vessel 118 and open the valve 268 to allow the liquid solvent to flow out of the filtering vessel 118 into the outlet conduit 200. As the solvent is supplied to the filtering vessel 118, the solvent is filtered therein, as described above. The pressurized gas supplied to the solvent reservoir 116 can continue to force the solvent to flow through the filters within the filtering vessel 118 and out of the filtering vessel 118 through the outlet conduit 200 toward the mixing tank 104.

The fluids described herein as flowing through and being processed by the system 100 generally flow through each of the components of the system 100, including the mixing tank 104, the winterization vessels 106, the filtering vessels 108, the fine filtering vessel 110, the holding tank 112, the evaporator 114, the solvent reservoir 116, and the filtering vessel 118 from top to bottom. That is, the fluids flow through the various components in a direction aligned with a force of gravity, so that gravity can assist in drawing the fluids through the various components. The fluids described herein as flowing through and being supplied through the various conduits 120 of the system 100 generally flow through the conduits from bottom to top, that is, against the flow of gravity. Thus, the pressurized inert gas described herein can be used to assist in supplying the fluids through the conduits against the force of gravity. In some cases, as described herein, the pressurized inert gas can work in concert with and assist in drawing or forcing the fluids through the components 104, 106, 108, 110, 112, 114, 116, and/or 118, as well.

FIGS. 17, 18, 24, and 25 illustrate additional conduits 120 that are used to circulate a coolant such as a slurry of isopropyl alcohol and dry ice (solidified carbon dioxide) or a slurry of liquid nitrogen and acetone, such as at a temperature of −137.2 degrees Fahrenheit, throughout the various cooled components (e.g., to the outer chambers of the various jacketed vessels) of the system 100. For example, FIGS. 17 and 18 illustrate that a first coolant conduit 274 can supply a coolant to a top end of an outer chamber of a top sidewall portion of the jacketed housing 156 of the evaporator 114. The coolant can flow throughout the outer chamber of the top sidewall portion of the jacketed housing 156 to cool the housing 156. FIGS. 17 and 18 further illustrate that a second coolant conduit 276 can supply the coolant from a bottom end of the outer chamber of the top sidewall portion of the jacketed housing 156 to a top end of the condenser 168. The coolant can flow throughout the condenser 168 to cool the condenser 168.

FIGS. 17 and 18 further illustrate that a third coolant conduit 278 can supply the coolant from a bottom end of the condenser 168 to a top end of an outer chamber of a bottom sidewall portion of the jacketed housing 156. The coolant can flow throughout the outer chamber of the bottom sidewall portion of the jacketed housing 156 to cool the housing 156. FIGS. 17 and 18 further illustrate that a fourth coolant conduit 280 can supply the coolant from a bottom end of the outer chamber of the bottom sidewall portion of the jacketed housing 156 to a first side of an outer chamber of a bottom end portion of the jacketed housing 156. The coolant can flow throughout the outer chamber of the bottom end portion of the jacketed housing 156 to cool the housing 156.

FIGS. 17, 18, 24, and 25 illustrate that a fifth coolant conduit 282 can supply a coolant from a second side of the outer chamber of the bottom end portion of the jacketed housing 156, opposite its first side, to a top end of an outer chamber of a sidewall portion of a jacketed housing of the solvent reservoir 116. The coolant can flow throughout the outer chamber of the sidewall portion of the jacketed housing of the solvent reservoir 116 to cool the housing. FIGS. 24 and 25 further illustrate that a sixth coolant conduit 284 can supply the coolant from a bottom end of the outer chamber of the sidewall portion of the jacketed housing of the solvent reservoir 116 to a first side of an outer chamber of a bottom end portion of the jacketed housing of the solvent reservoir 116. The coolant can flow throughout the outer chamber of the bottom end portion of the jacketed housing to cool the housing. FIGS. 24 and 25 further illustrate that a seventh coolant conduit 286 can return the coolant from a second side of the outer chamber of the bottom end portion of the jacketed housing of the solvent reservoir, opposite its first side, to the chiller for further chilling. While the coolant is described as flowing from the chiller, through the first coolant conduit 274, then the second coolant conduit 276, then the third coolant conduit 278, then the fourth coolant conduit 280, then the fifth coolant conduit 282, then the sixth coolant conduit 284, then the seventh coolant conduit 286, then back to the chiller, the coolant could flow in the opposite direction in other implementations. Further, in some implementations, the system 100 can also include additional coolant conduits that supply coolant from the chiller to the outer chambers of the winterization vessels 106 and back from the outer chambers of the winterization vessels 106 to the chiller.

In some implementations, any of the components of the system 100 described herein can include a sight window, which can be a transparent component that can allow an operator or a video or still camera to view inside the respective component. For example, FIG. 7 illustrates that each of the winterization vessels 106 can include a transparent sight window 288, FIGS. 15 and 16 illustrate that the holding tank 112 can include a transparent sight window 290, FIG. 17 illustrates that the evaporator 114 can include a transparent sight window 292, and FIGS. 24 and 25 illustrate that the solvent reservoir 116 includes two sight windows at its top end. Each of the sight windows allows an operator to illuminate and/or monitor the processing taking place within the respective component of the system 100 through the window, such as for quality control purposes. In some implementations, cameras and/or lights can also be mounted inside any of the components described herein, to further assist in monitoring the operation of the system 100. In some implementations, the transparent sight windows themselves can be made of fused quartz.

Figure 28:
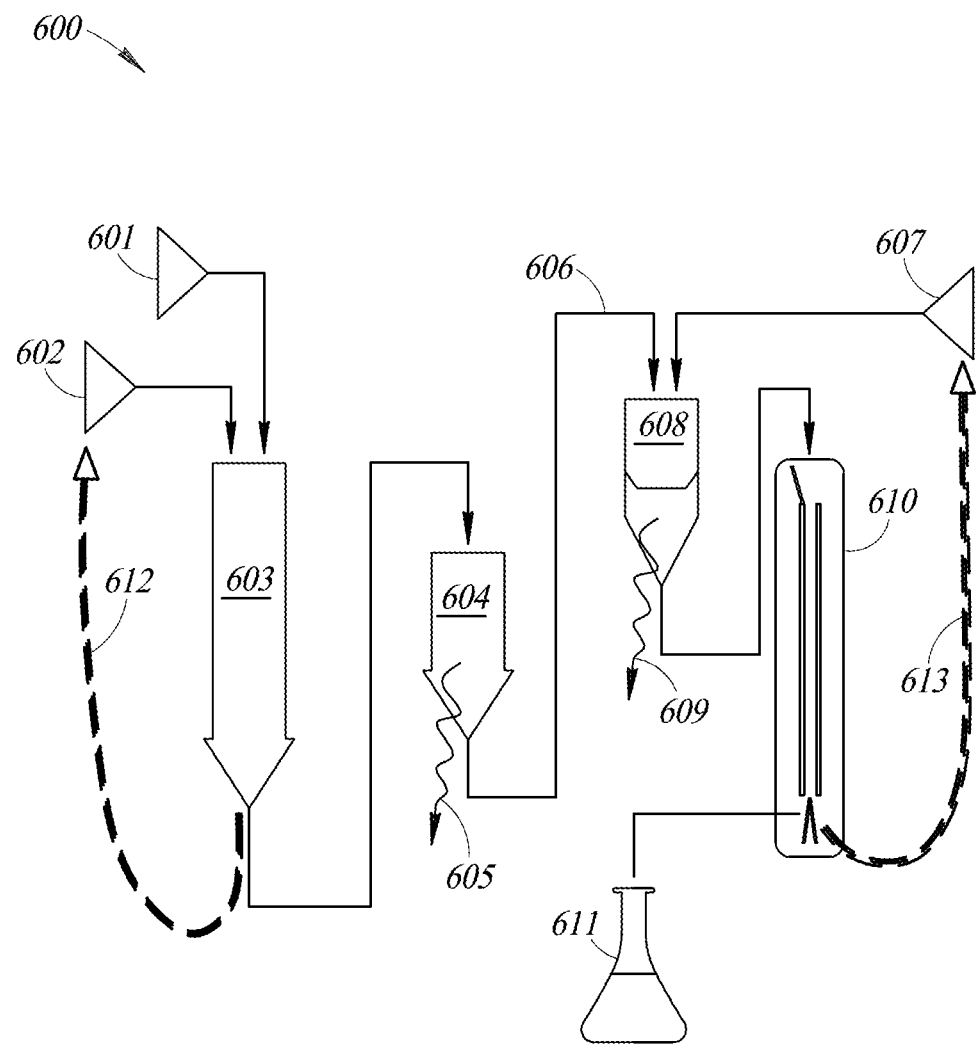
FIG. 28 illustrates a schematic view of a system for separating and purifying essential oils from other plant material.

FIG. 28 illustrates another system 600 for extracting essential oils from plant material. The system 600 can include any of the features described above for the system 100, and the system 100 can include any of the features described herein for system 600. As illustrated in FIG. 28, plant material 601 is combined with a non-polar solvent 602 in an extractor 603, which is chilled and removes the essential oils, along with some impurities, from the plant material. These impure essential oils are then filtered through a molecular sieve 604 that removes large impurities like chlorophyll. The impurities and debris 605 are then discarded. The filtered essential oils 606 are then combined with a polar solvent 607 such that the essential oils, terpenes, and terpenoids dissolve in the polar solvent, and the mixture is fed through another filter 608 to separate out additional impurities and paraffin waxes 609, which are then discarded. The purified solvent-concentrate mixture is then fed into an evaporator 610, which separates the essential oils from the polar solvent in manner similar to that described above for the system 100 and the evaporator 114. The separated essential oils 611 are then collected for later use. The non-polar solvent 602 can be recycled through a flow path 612 and the polar solvent 607 can be recycled through a flow path 613.

Figures 29, 30:
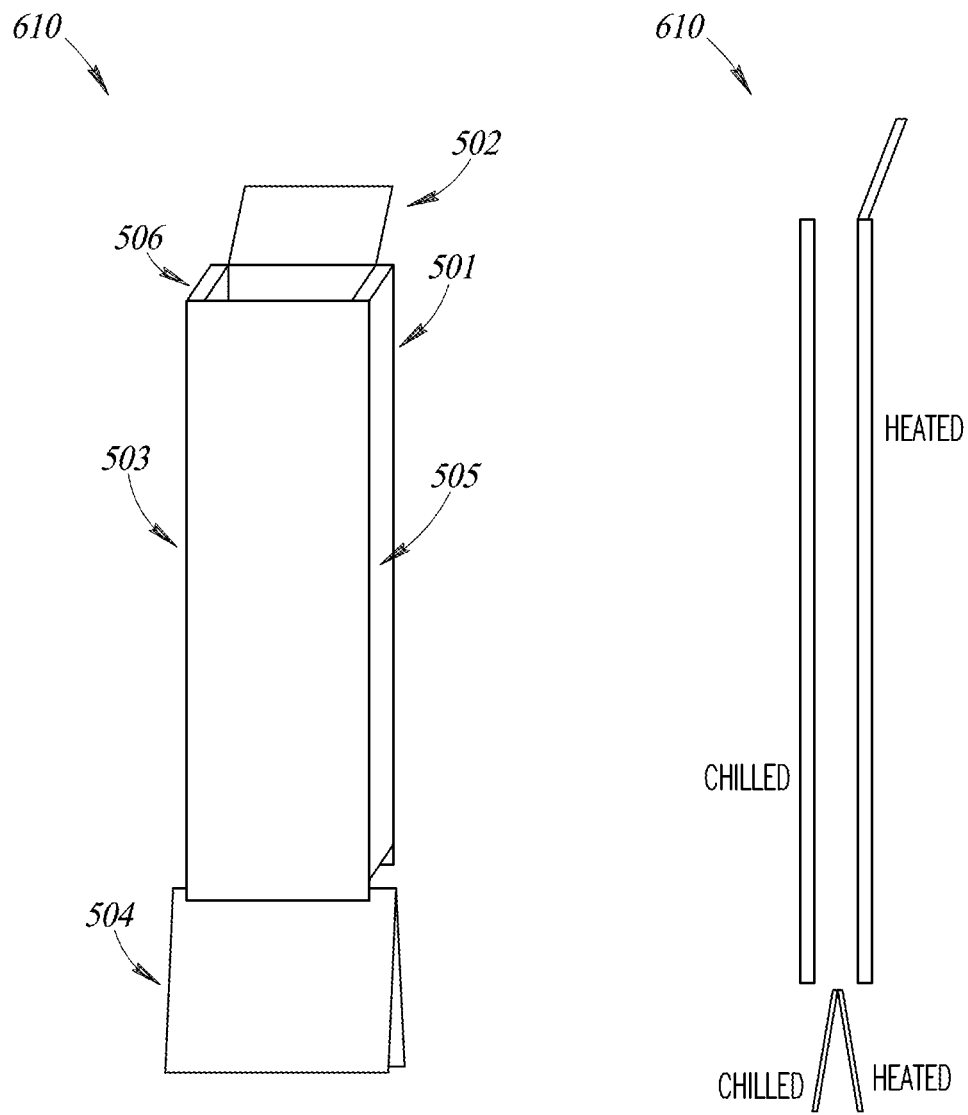
FIG. 29 illustrates a perspective view of an evaporator of the system of FIG. 28.
FIG. 30 illustrates a side view of the evaporator of FIG. 29.
Figure 31:
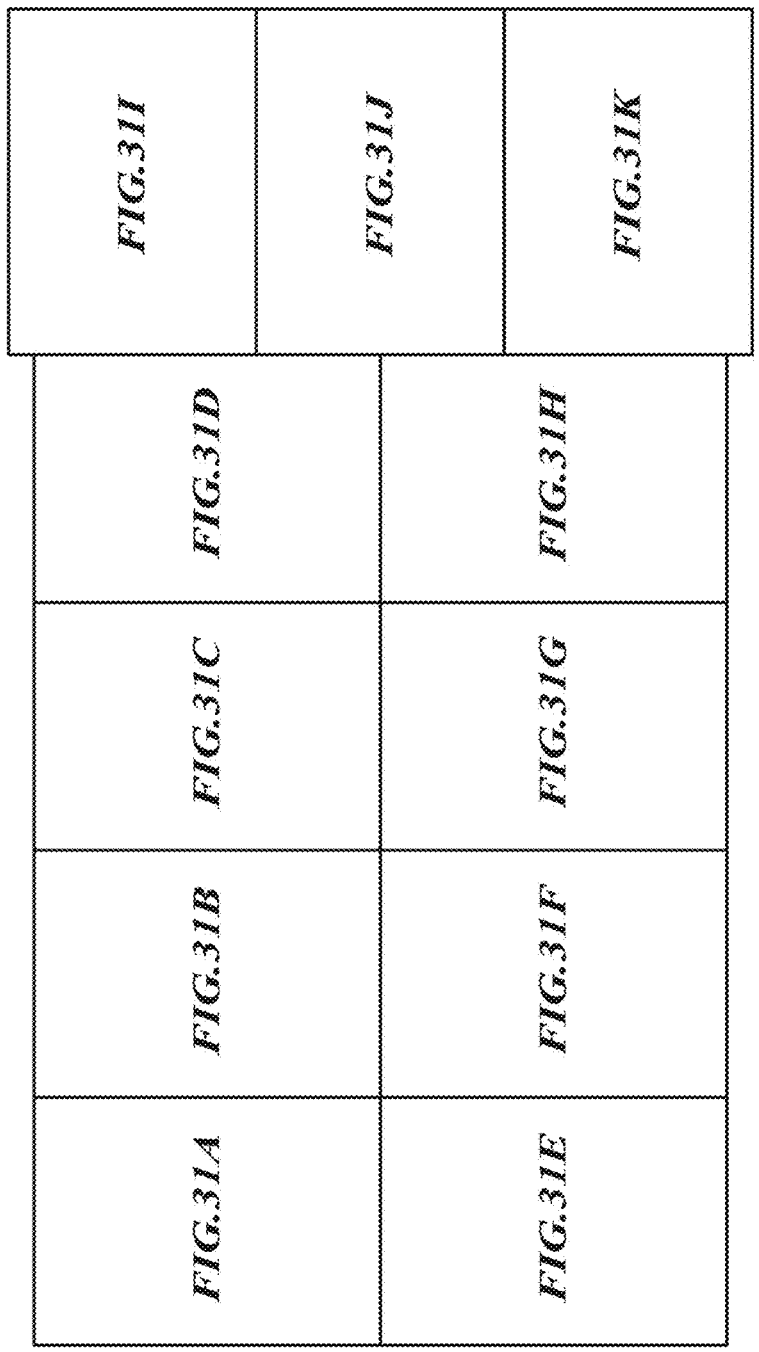
FIG. 31 illustrates an arrangement of FIGS. 31A-31K depicting the layout of the schematic.
Figure 31B:
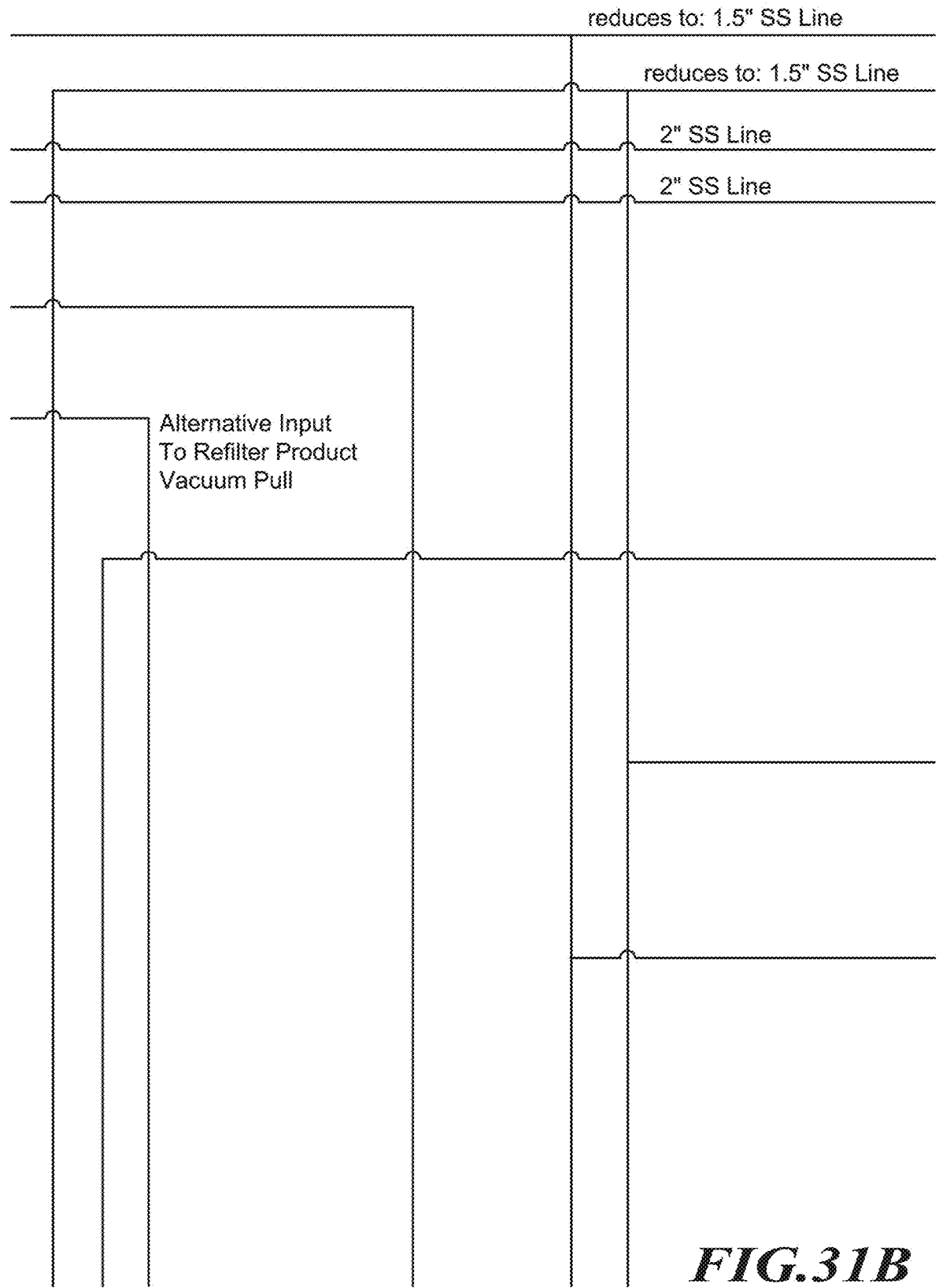
FIG. 31B illustrates an upper inner left portion of the schematic view of the system of FIG. 31A for separating and purifying essential oils from other plant material.
Figure 31C:
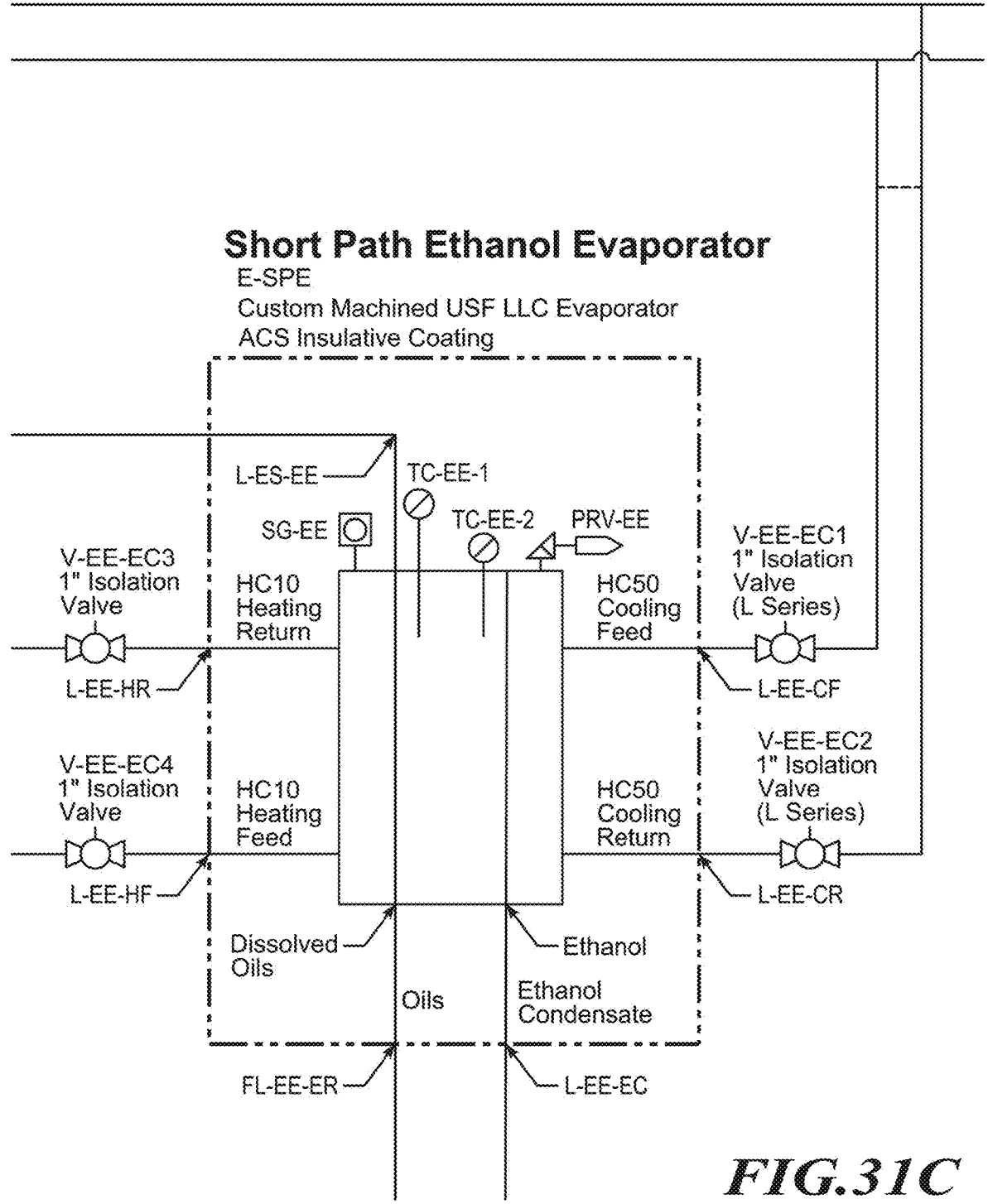
FIG. 31C illustrates an upper inner right portion of the schematic view of the system of FIGS. 31A and 31B for separating and purifying essential oils from other plant material.
Figure 31D:
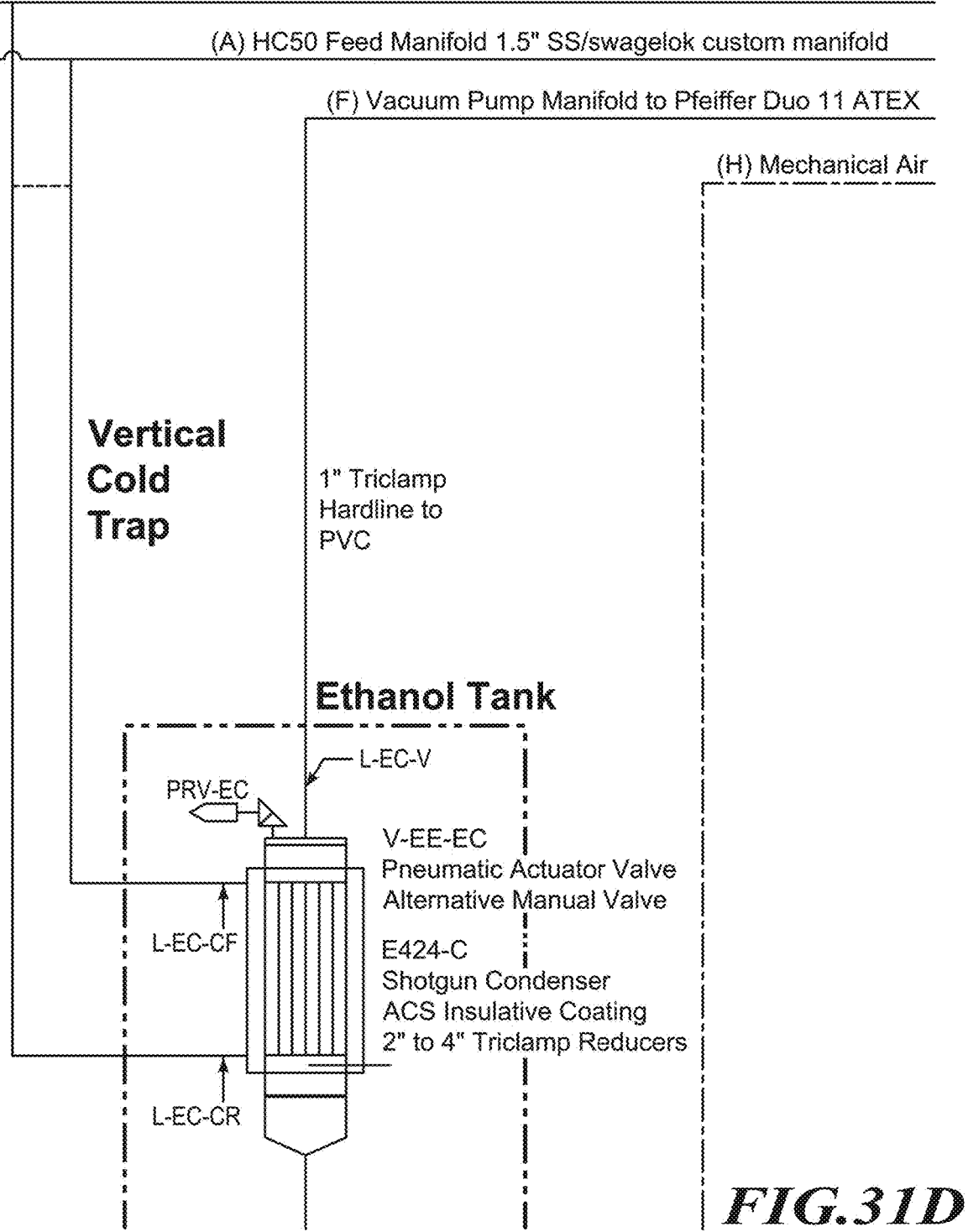
FIG. 31D illustrates an upper outer right portion of the schematic view of the system of FIGS. 31A-31C for separating and purifying essential oils from other plant material.
Figure 31E:
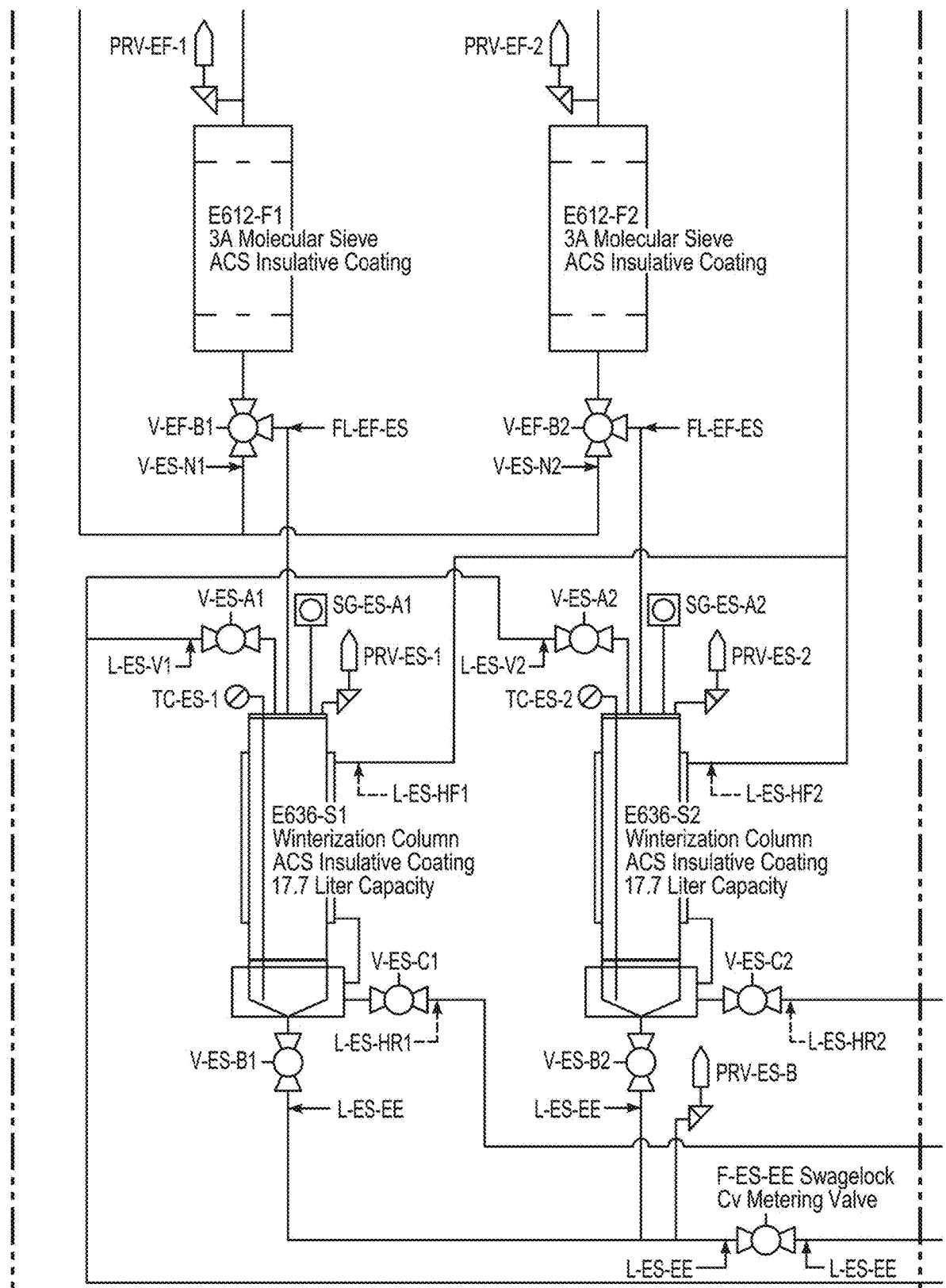
FIG. 31E illustrates a lower outer left portion of the schematic view of the system of FIGS. 31A-31D for separating and purifying essential oils from other plant material.
Figure 31F:
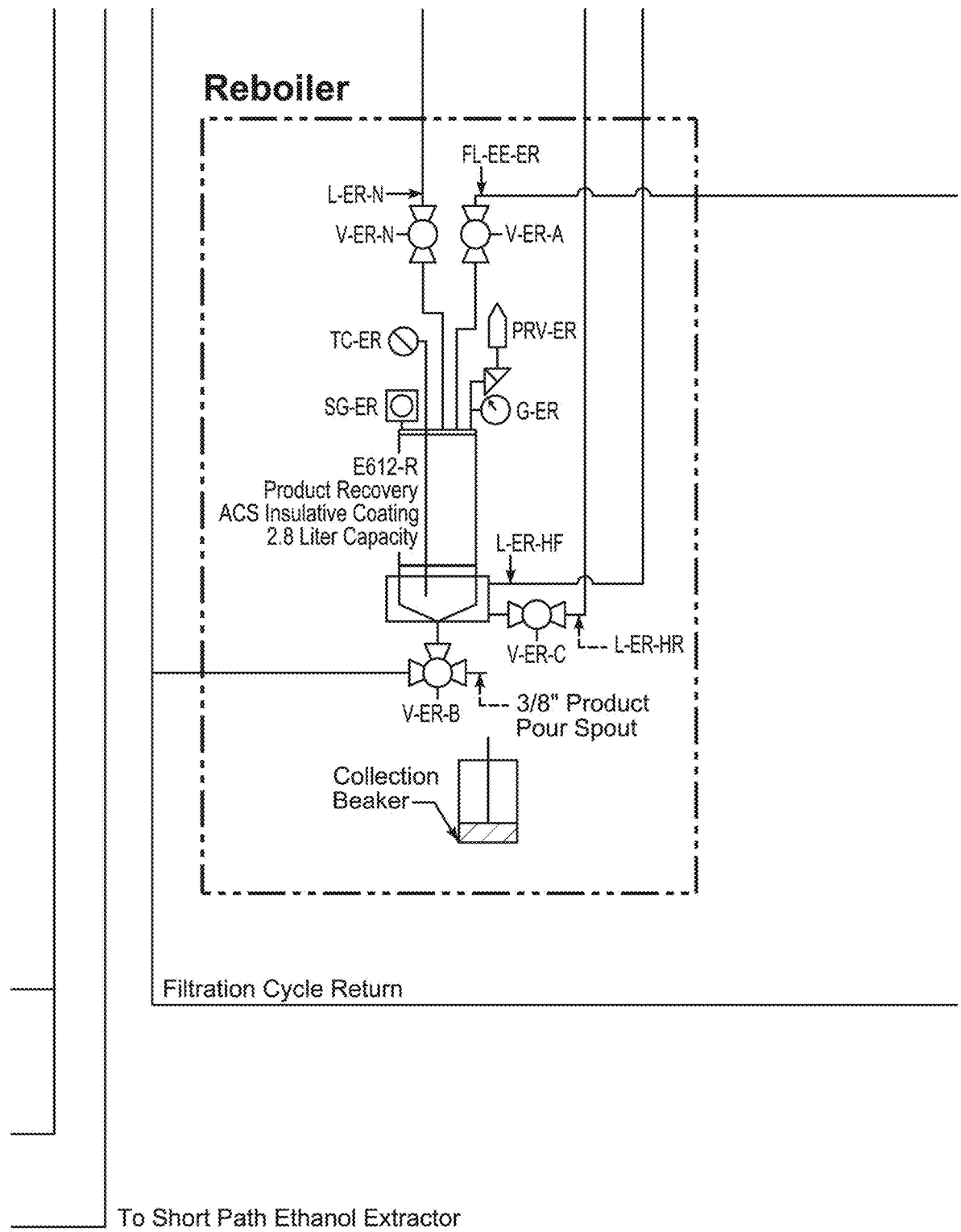
FIG. 31F illustrates a lower inner left portion of the schematic view of the system of FIGS. 31A-31E for separating and purifying essential oils from other plant material.
Figure 31G:
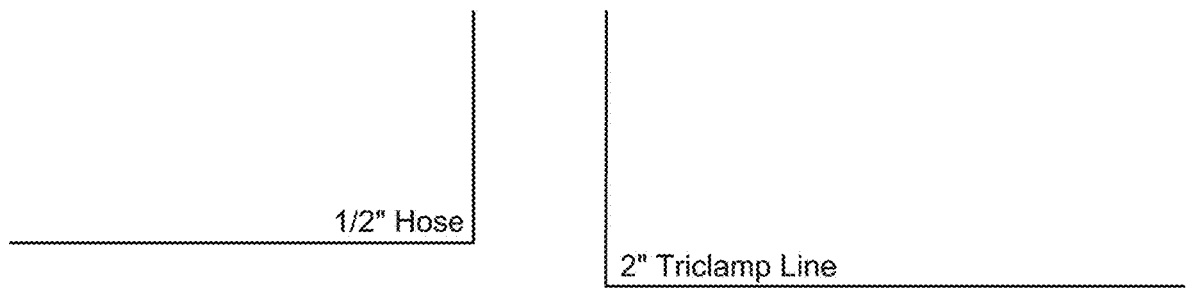
FIG. 31G illustrates a lower inner right portion of the schematic view of the system of FIGS. 31A-31E for separating and purifying essential oils from other plant material.
Figure 31H:
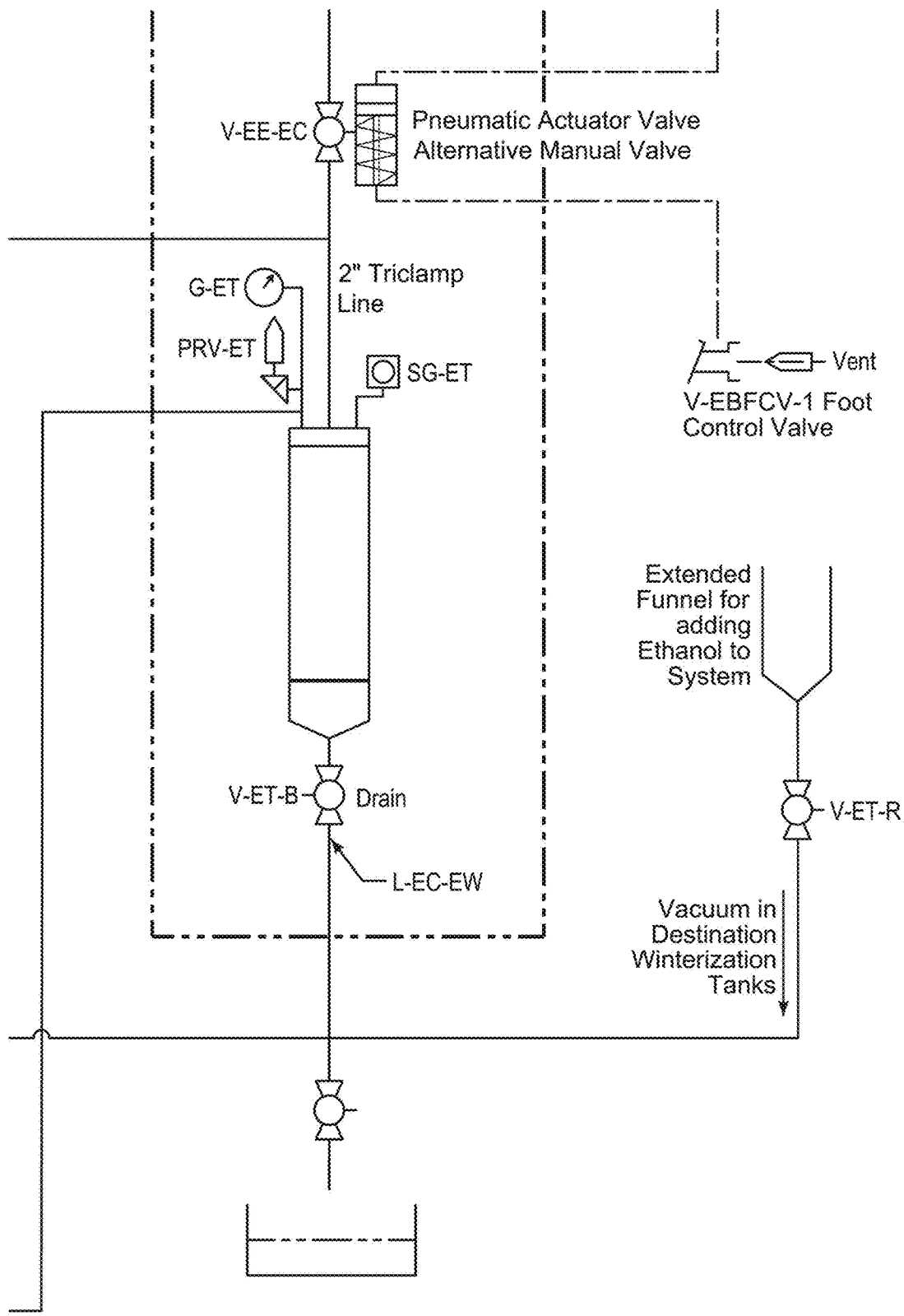
FIG. 31H illustrates a lower outer right portion of the schematic view of the system of FIGS. 31A-31G for separating and purifying essential oils from other plant material.

FIG. 29 illustrates a perspective view and FIG. 30 illustrates a side view of the evaporator 610. In particular, FIG. 29 illustrates that the evaporator 610 includes a first vertical plate 501 and a second vertical plate 503 that is generally parallel to and spaced apart from the first vertical plate 501 by between ¼ inch and 3 inches. The evaporator 610 also includes a feeder component 502 that can feed the mixture of essential oils and solvent onto the first vertical plate 501 and a separator component 504, which can comprise a wedge, that separates the solvent from the essential oils as they fall down to the bottom of the evaporator 610. The evaporator 610 also includes a pair of sight glasses 505 and 506 that each span from the first vertical plate 501 to the second vertical plate 503 to allow an operator to see in between the plates 501 and 503 during operation. In some implementations, the components of the evaporator 610 described herein are positioned within an enclosed chamber and a vacuum is drawn within the chamber to improve the processing within the chamber. In some implementations, the plates 501 and 503 and the sight glasses 505 and 506 form four sidewalls of an enclosed chamber and a vacuum is drawn within the chamber to improve processing within the chamber.

In operation, the first vertical plate 501 can be heated, such as in a manner similar to that described herein for the evaporator plate assembly 136, and the second vertical plate 503 can be chilled, such as in a manner similar to that described herein for the housing 156. The mixture of the essential oils and the solvent can be fed onto the first vertical plate 501 by the feeder component 502. As the mixture travels down the first vertical plate 501, the solvent can evaporate therefrom due to its elevated temperature, and the evaporated solvent can then condense on the second vertical plate 503 due to its lowered temperature, and then travel down the second vertical plate 503. As the essential oils reach the bottom of the first vertical plate 501, they can drip off the bottom end of the first vertical plate 501 and onto a heated first side of the separator component 504. As the condensed solvent reaches the bottom of the second vertical plate, it can drip off the bottom end of the second vertical plate 503 and onto a chilled second side of the separator component 504 opposite its first side.

FIGS. 31A, 31B, 31C, 31D, 31E, 31F, 31G, and 31H illustrate upper outer left, upper inner left, upper inner right, upper outer right, lower outer left, lower inner left, lower inner right, and lower outer right portions, respectively, of a schematic diagram of another system for processing essential oils. FIGS. 31I illustrates a legend representing the schematic illustrated in FIGS. 31-31H. FIG. 31J and 31K illustrate a bill of materials representing the schematic illustrated in FIGS. 31A-31H. As illustrated in FIGS. 31A-31K, the system represented therein includes a winterization filtration system, an evaporator system, a reboiler system, a cold trap condenser system, and a tank system for holding a solvent such as ethanol. The system illustrated in FIGS. 31A-31K can include any of the features described and illustrated elsewhere herein, and the systems described elsewhere herein can include any of the features of the system illustrated in FIGS. 31A-31K.

Advantages of the systems described herein include that the thin-film evaporation of the polar solvent within the evaporator 114 results in reduced nucleate boiling relative to other systems. Further, the systems and techniques described herein maintain the mixture including the essential oils at elevated temperatures for less overall time than other systems, thus preserving the essential oils and reducing their degradation. Further, the systems described herein can rely on a single chiller unit to chill multiple components of the overall system 100, thereby reducing cost and improving overall efficiency.

U.S. provisional patent application No. 62/554,576, filed Sep. 6, 2017, and 62/692,924, filed Jul. 2, 2018 are incorporated herein by reference, in their entireties. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for separating oils from a solvent, comprising:
an outer housing including an inner chamber, wherein a pressure within the inner chamber is less than 120 Torr;
a plate located within the inner chamber, wherein a temperature of the plate is between 70 and 120 degrees Fahrenheit;
a source of a mixture of the oils and the solvent, the source positioned to supply the mixture onto the plate;
a surface located within and exposed to the inner chamber, wherein a temperature of the surface is below 40 degrees Fahrenheit;
a first collecting conduit positioned to receive the oils from the plate and carry the oils out of the inner chamber and out of the outer housing; and
a second collecting conduit positioned to receive the solvent from the surface and carry the solvent out of the inner chamber and out of the outer housing.

2. The system of claim 1 wherein the surface is an inner surface of the outer housing.

3. The system of claim 1 wherein the mixture of the oils and the solvent is located on the plate and the oils are essential oils of cannabis plant material.

4. A method of separating oils from a solvent, comprising:
drawing a vacuum within an inner chamber of an outer housing so that a pressure within the inner chamber of the outer housing is below 120 Torr;
heating a plate located within the inner chamber of the outer housing to above a boiling temperature of the solvent at the pressure within the inner chamber;
cooling an inner surface of the outer housing, the inner surface of the outer housing located within and exposed to the inner chamber of the outer housing, to below the boiling temperature of the solvent at the pressure within the inner chamber;
supplying a mixture of the oils and the solvent onto the plate and allowing the mixture to run down the plate as the solvent boils out of the mixture and condenses on the cooled surface;
carrying the oils out of the inner chamber and out of the outer housing through a first collecting conduit; and
carrying the solvent out of the inner chamber and out of the outer housing through a second collecting conduit.

5. The method of claim 4 wherein supplying the mixture onto the plate includes spraying the mixture onto a top portion of the plate.

6. The method of claim 4, wherein the oils are essential oils of cannabis plant material.

* * * * *